United States Patent
Patil et al.

(10) Patent No.: US 11,271,834 B2
(45) Date of Patent: Mar. 8, 2022

(54) PAGE MONITORING ENABLEMENT AND DISABLEMENT

(71) Applicant: QUALCOMM Incorporated, San Diego, CA (US)

(72) Inventors: Abhishek Pramod Patil, San Diego, CA (US); Alfred Asterjadhi, San Diego, CA (US); George Cherian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 20 days.

(21) Appl. No.: 15/806,018

(22) Filed: Nov. 7, 2017

(65) Prior Publication Data

US 2018/0131587 A1 May 10, 2018

Related U.S. Application Data

(60) Provisional application No. 62/419,460, filed on Nov. 8, 2016.

(51) Int. Cl.
*H04W 68/00* (2009.01)
*H04L 43/08* (2022.01)
(Continued)

(52) U.S. Cl.
CPC ......... *H04L 43/08* (2013.01); *H04W 52/0216* (2013.01); *H04W 68/00* (2013.01);
(Continued)

(58) Field of Classification Search
CPC combination set(s) only.
See application file for complete search history.

(56) References Cited

U.S. PATENT DOCUMENTS 8,588,728 B1 * 11/2013 Hassan ............ H04W 52/0261
455/343.2
2004/0227618 A1 * 11/2004 Hwang ................. H04W 4/06
340/7.46
(Continued)

FOREIGN PATENT DOCUMENTS

CN 101583178 A 11/2009
CN 102547936 A 7/2012
(Continued)

OTHER PUBLICATIONS

International Search Report and Written Opinion—PCT/US2017/060536—ISA/EPO—dated Feb. 7, 2018.

*Primary Examiner* — Justin Y Lee
(74) *Attorney, Agent, or Firm* — Arent Fox, LLP

(57) ABSTRACT

Example methods, apparatuses, and computer-readable mediums for wireless communication are provided. In one example, an apparatus may be configured to determine a first interval between a first page transmission time and a second page transmission time. A third page transmission time may exist between the first page transmission time and the second page transmission time. The apparatus may be configured to enter a first state during which the first device is monitoring for a page transmission from a second device based on the first interval for a first state time period. The apparatus may be configured to enter, from the first state in response to a trigger event, a second state during which the first device is disabled from monitoring for a page transmission from the second device.

49 Claims, 12 Drawing Sheets

(51) Int. Cl.
    *H04W 52/02*    (2009.01)
    *H04W 88/02*    (2009.01)
    *H04W 76/28*    (2018.01)
    *H04L 5/00*    (2006.01)
    *H04L 49/15*    (2022.01)
    *H04W 84/12*    (2009.01)

(52) U.S. Cl.
    CPC ........... *H04W 88/02* (2013.01); *H04L 5/0005* (2013.01); *H04L 5/0007* (2013.01); *H04L 49/15* (2013.01); *H04W 76/28* (2018.02); *H04W 84/12* (2013.01)

(56) References Cited

U.S. PATENT DOCUMENTS

| | | | |
|---|---|---|---|
| 2008/0198795 A1* | 8/2008 | Kim | H04W 72/0406 370/328 |
| 2008/0205340 A1 | 8/2008 | Meylan et al. | |
| 2011/0058510 A1 | 3/2011 | Thomas et al. | |
| 2011/0059779 A1* | 3/2011 | Thomas | H04W 52/0216 455/574 |
| 2013/0155930 A1 | 6/2013 | Chu et al. | |
| 2013/0242828 A1* | 9/2013 | Sahu | H04W 52/0229 370/311 |
| 2014/0022087 A1 | 1/2014 | Lin et al. | |
| 2014/0071887 A1 | 3/2014 | Tian et al. | |
| 2014/0112229 A1* | 4/2014 | Merlin | H04W 52/0209 370/311 |
| 2015/0327215 A1* | 11/2015 | Xu | H04W 68/005 455/435.1 |

FOREIGN PATENT DOCUMENTS

| | | |
|---|---|---|
| CN | 103874170 A | 6/2014 |
| EP | 2846597 A1 | 3/2015 |
| WO | 2014081565 A1 | 5/2014 |

\* cited by examiner

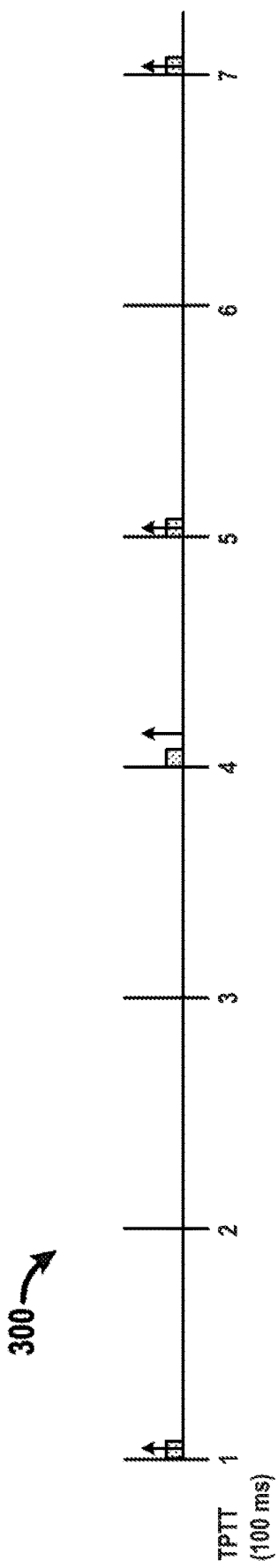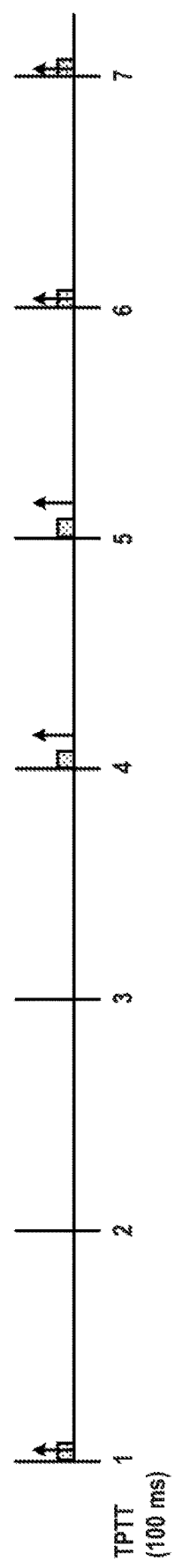
FIG. 3A
FIG. 3B

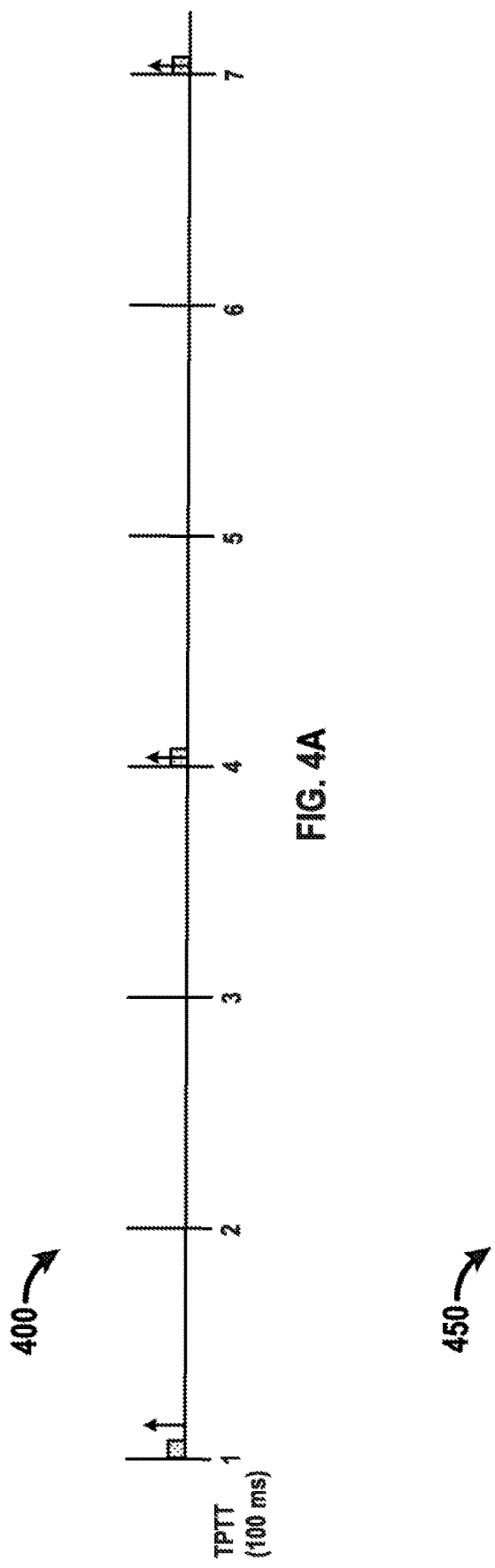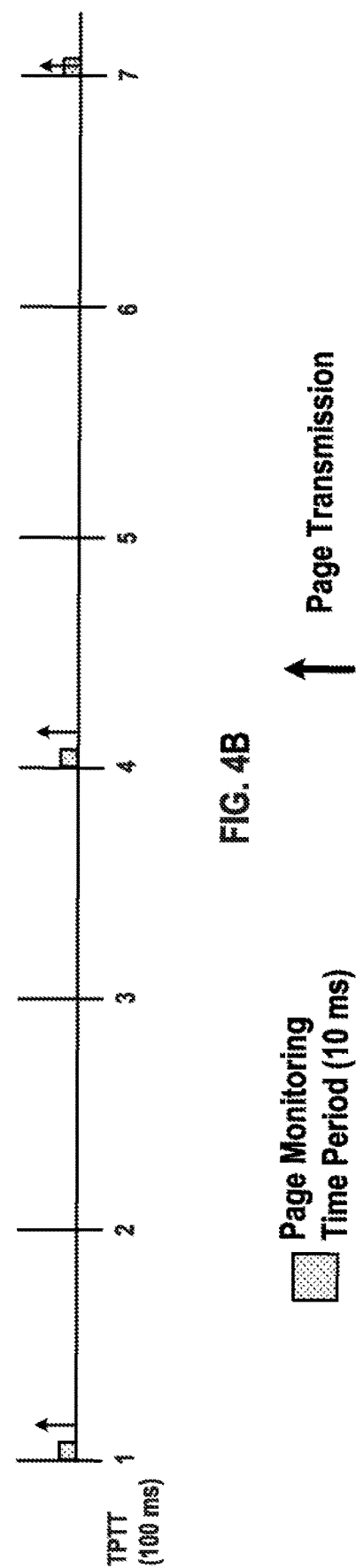

PAGE MONITORING ENABLEMENT AND DISABLEMENT

CROSS-REFERENCE TO RELATED APPLICATION(S)

This application claims the benefit of U.S. Provisional Application No. 62/419,460 entitled "WAKE TBTT SERVICE PERIOD" and filed on Nov. 8, 2016, which is expressly incorporated by reference herein in its entirety.

BACKGROUND

Field

The present disclosure relates generally to communication systems, and more particularly, to establishment of a page monitoring schedule and/or operation in accordance with a page monitoring schedule.

Background

In many telecommunication systems, communications networks are used to exchange messages among several interacting spatially-separated devices. Networks may be classified according to geographic scope, which may be, for example, a metropolitan area, a local area, or a personal area. Such networks may be designated respectively as a wide area network (WAN), metropolitan area network (MAN), local area network (LAN), wireless local area network (WLAN), or personal area network (PAN). Networks may also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks may be preferred when the network elements are mobile and thus have dynamic connectivity needs, or if the network architecture is formed in an ad hoc, rather than fixed, topology. Wireless networks may employ intangible physical media in an unguided propagation mode using electromagnetic waves in the radio, microwave, infrared, optical, or other frequency bands. Wireless networks may advantageously facilitate user mobility and rapid field deployment when compared to fixed wired networks.

An access point (AP) may be configured to transmit (e.g., broadcast) a plurality of beacons. Each beacon of the plurality of beacons may be transmitted by the AP at a respective beacon transmission time. A station (STA) may be configured to monitor for a beacon at every beacon transmission time. However, monitoring, by the STA, for a beacon at every beacon transmission time may be undesirable.

SUMMARY

The systems, apparatuses, computer program products, and methods of this disclosure each have several aspects, no single one of which is solely responsible for the desirable attributes disclosed herein.

One aspect of this disclosure provides a wireless device (e.g., a station) for wireless communication. The wireless device may be configured to determine an interval cycle to receive a page and an awake time period, where the awake time period is a maximum time period during which the wireless device stays awake to receive the page. The wireless device may be configured to activate communication capability with an access point at a start time of a current cycle of the interval cycle. The wireless device may be configured to maintain the communication capability with the access point to receive a page from the access point at least until the awake time period expires after the start time of the current interval cycle.

Another aspect of this disclosure provides a first device for wireless communication. The first device may be configured to determine a first interval between a first page transmission time and a second page transmission time. A third page transmission time may exist between the first page transmission time and the second page transmission time. The first device may be configured to enter a first state during which the first device is configured to monitor for a page transmission from a second device based on the first interval for a first state time period. The first device may be configured to enter, from the first state in response to a trigger event, a second state during which the first device is disabled from monitoring for a page transmission from the second device.

Another aspect of this disclosure provides an access point for wireless communication. The access point may be configured to negotiate with a wireless device for an interval cycle and an awake time period. The access point may be configured to receive the interval cycle and the awake time period from the wireless device. In an aspect, a start time of each cycle of the interval cycle is a time at which the wireless device activates communication capability with the access point to receive a page from the access point and the awake time period is a maximum time period during which the wireless device maintains the communication capability to receive the page from the access point.

Another aspect of this disclosure provides a first device for wireless communication. The first device may be configured to receive, from a second device, a first message. The first device may be configured to determine a first interval based on the first message for establishing a schedule with the second device. The schedule may include the first interval between a first page transmission time and a second page transmission time. A third page transmission time may exist between the first page transmission time and the second page transmission time. The first device may be configured to send a second message including the first interval to the second device for establishing the schedule with the second device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 3A and 3B are example diagrams illustrating retransmission of a page when a page is not received by a wireless station in accordance with the techniques described herein.

FIGS. 4A and 4B are example diagrams illustrating retransmission of a page when a page is not received by a wireless station in accordance with the techniques described herein.

DETAILED DESCRIPTION

Figure 1:
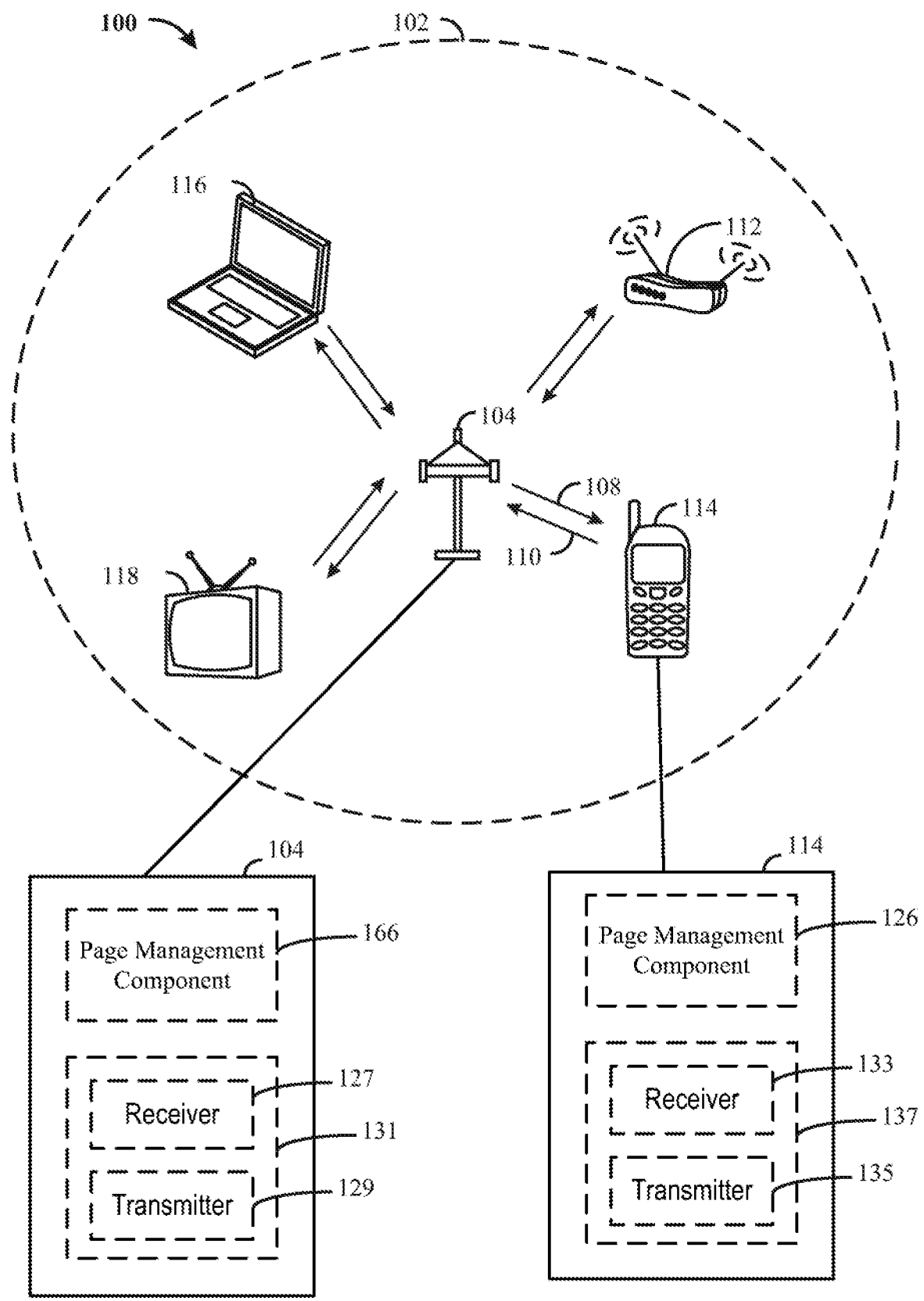
FIG. 1 illustrates an example wireless communication system in accordance with the techniques described herein.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. Any aspect disclosed herein may be embodied by one or more elements of a claim.

Although particular aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an IEEE 802.11 protocol using orthogonal frequency-division multiplexing (OFDM), direct-sequence spread spectrum (DSSS) communications, a combination of OFDM and DSSS communications, or other schemes. Implementations of the IEEE 802.11 protocol may be used for sensors, metering, and smart grid networks. Aspects of certain devices implementing the IEEE 802.11 protocol may consume less power than devices implementing other wireless protocols, and/or may be used to transmit wireless signals across a relatively long range, for example about one kilometer or longer.

A WLAN may include various devices that access the wireless network. For example, there may be two types of devices: access points (APs) and clients (also referred to as stations or "STAs"). In general, an AP may serve as a hub or base station for the WLAN and a STA serves as a client of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain connectivity to the Internet or to other wide area networks. In some aspects, a STA may also be used as an AP.

An access point may also be referred to as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also be referred to as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In an aspect, MIMO schemes may be used for wide area WLAN (e.g., Wi-Fi) connectivity. MIMO may exploit a radio-wave characteristic called multipath. In multipath, transmitted data may bounce off objects (e.g., walls, doors, furniture), reaching the receiving antenna multiple times through different routes and at different times. A WLAN device that employs MIMO may split a data stream into multiple parts, called spatial streams (or multi-streams), and transmit each spatial stream through separate antennas to corresponding antennas on a receiving WLAN device. Additionally, the growth in MIMO schemes has led to the emergence of multi-user (MU) MIMO schemes which support multiple connections on a single channel (e.g., a single conventional channel) where different STAs are identified by spatial signatures.

The term "associate," or "association," or any variant thereof should be given the broadest meaning possible within the context of the present disclosure. By way of example, when a first apparatus associates with a second apparatus, the two apparatuses may be directly associated or intermediate apparatuses may be present. For purposes of brevity, the process for establishing an association between two apparatuses will be described using a handshake protocol that utilizes an "association request" by one of the apparatus followed by an "association response" by the other apparatus. The handshake protocol may utilize other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, any combination thereof (e.g., A-B, A-C, B-C, and A-B-C), or multiple instances of an item (e.g., A-A-B-C).

As discussed above, certain devices described herein may employ a communication protocol specified by an IEEE 802.11 standard, for example. Such devices (whether used as a STA, an AP, or other device) may be used for smart metering or used in a smart grid network. Such devices may provide sensor applications or may act as sensors as well or may be used in home automation. The devices may be used in a healthcare context, for example for personal healthcare. The devices may also be used for surveillance, be used to enable extended-range Internet connectivity (e.g. for use with hotspots), or for machine-to-machine communications.

In some examples, a STA may be configured to wake up at every beacon transmission time (e.g., every target beacon transmission time (TBTT)) to receive a beacon transmitted by an AP. For example, an AP may be configured to transmit (e.g., broadcast) a plurality of beacons. Each beacon of the plurality of beacons may be transmitted by the AP at a respective beacon transmission time. In some examples, the beacon transmission time for each respective beacon may be a TBTT for each respective beacon. A STA may be configured to monitor for the plurality of beacons. For example, a STA may be configured to monitor for a beacon at each beacon transmission time. If a STA receives a beacon that does not contain information for the STA, the STA may enter a state during which the STA does not monitor or is otherwise disabled from monitoring for a beacon. The STA may be configured to wakeup from this monitoring disabled state into a monitoring enabled state. For example, the STA may be configured to enter the monitoring enabled state to monitor for the next beacon associated with the next beacon transmission. If the STA receives a beacon that contains information for the STA, the STA may stay awake to perform any activities associated with the information contained in the beacon.

In some examples, monitoring, by a STA, for a beacon at every beacon transmission time may be undesirable because the STA may desire to conserve power, prolong its battery life, reduce is power consumption, or the like. In such examples, there is a need to enable the STA to inform the AP of the STA's preference to not wake up for every beacon (e.g., the STA's preference to not monitor for every beacon). For example, in accordance with the techniques described herein, a STA operating in low power mode and/or in low traffic may be configured to wake up from time to time only to receive certain beacons (e.g., one beacon in every seven beacon transmissions). Otherwise described, a STA operating in low power mode and/or in low traffic may be configured to monitor for a beacon transmission at less than all of the beacon transmission times that an AP is configured to transmit (e.g., broadcast) a beacon. In such an example, the STA may be configured to stay asleep (i.e., stay in a state during which the STA does not monitor for a beacon transmission at a time that the AP is configured to transmit a beacon) and wake up (i.e., enter a state during which the STA monitors for a beacon transmission at a time that the AP is configured to transmit a beacon) only at certain beacon transmission times to receive a beacon. There is also a need to define (1) a period of time that the STA remains awake to receive a beacon from the AP for which the STA is monitoring, and (2) any subsequent actions performed by the AP and/or the STA if the STA does not receive the beacon during the period of time that the STA remains awake to receive the beacon.

In accordance with the techniques described herein, a STA (e.g., STA 114) and/or an AP (e.g., AP 104) may be configured to perform page management. Page management may differ depending on whether the wireless device is a STA or an AP. For example, in accordance with the techniques described herein, a STA may be configured to monitor for beacons such that the STA does not monitor for every beacon that an AP is configured to transmit. In some examples, the AP may be configured such that the AP does not transmit information specific to a STA in every beacon. In such examples, the AP may be configured to transmit the information specific to the STA in a beacon for which the STA is scheduled to monitor. Otherwise described, the AP may be configured to not transmit information specific to a STA in a beacon for which the STA is not scheduled to monitor. For example, the AP and the STA may establish a page monitoring schedule in accordance with the techniques described herein. The page monitoring schedule may identify the beacon transmission times at which the STA will monitor for a beacon. Therefore, based on the page monitoring schedule, the AP may be aware of the beacon transmission times for which a STA is scheduled to monitor and the beacon transmission times for which the STA is not scheduled to monitor for beacons transmitted by the AP. The AP may be configured to send information to the STA in a beacon for which the STA is scheduled to monitor to increase signaling efficiency, reduce bandwidth consumption, and reduce power consumption.

As used herein, reference to information being specific to a STA in a page may refer to information that the STA may be configured to process. For example, information being specific to a STA may not refer to information only for the STA. For example, a first STA and a second STA may be configured to receive the same page. The page may include information specific to the first STA and information specific to the second STA. In some examples, the information specific to the first STA and the information specific to the second STA may be the same. In other examples, the information specific to the first STA and the information specific to the second STA may be different. Thus, a page may include information that is common (e.g., shared)

amongst several devices and/or information specific to a given device. Depending on the example, reference to page including information specific to a device may refer to information that is common or otherwise shared by one or more other devices. For example, the information specific to a first device may be information that the first device is configured to process, just like the same information specific to a second device may be information that the second device is configured to process.

In some examples, a page may refer to at least one of: a beacon, a fast initial link setup (FILS) discovery frame, or a traffic indication map (TIM) frame. Similarly, a beacon, an FILS discovery frame, or a TIM frame may refer to a type of page. For example, reference to a beacon, beacon message, or beacon transmission herein may similarly refer to a page, page message, or page transmission, respectively. In some examples, a page may refer to a broadcast message, where a broadcast message is broadcast (as opposed to unicast).

FIG. 1 illustrates an example wireless communication system 100 in which aspects of the present disclosure may be employed. The wireless communication system 100 may operate pursuant to a wireless standard, for example the IEEE 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDMA/MU-MIMO techniques. In such a case, the wireless communication system 100 may be referred to as an OFDMA/MU-MIMO system. Alternatively, signals may be sent and received between the AP 104 and the STAs in accordance with CDMA techniques. In such a case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast traffic (e.g., communications), multicast traffic, and/or broadcast traffic.

In some aspects, the AP 104 may suppress adjacent channel interference (ACI) so that the AP 104 may receive UL communications on more than one channel concurrently while reducing analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) may be the coverage area of an AP (e.g., the AP 104). The AP 104 along with the STAs associated with the AP 104 and that use the AP 104 for communication may be referred to as a basic service set (BSS). The wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a page signal (or simply a "page"), via a communication link such as the downlink 108, to other nodes (STAs) of the wireless communication system 100. The page signal may help the other nodes (STAs) synchronize their timing with the AP 104. Alternatively or additionally, the page signal may provide other information or functionality. Such pages may be transmitted periodically. In one aspect, the period between successive transmissions of a page may be referred to as a superframe. Transmission of a page may be divided into a number of groups or intervals. In one aspect, the page may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a page may include information that is common (e.g., shared) amongst several devices and/or information specific to a given device.

In some examples, a STA (e.g., STA 114) may associate with the AP 104 in order to send communications to and/or to receive communications from the AP 104. In one aspect, information for associating may be included in a page broadcast by the AP 104. To receive such a page, the STA 114 may, for example, perform a broad coverage search over a coverage region. A search may also be performed by the STA 114 by sweeping a coverage region in a lighthouse fashion, for example. After receiving the information for associating, the STA 114 may transmit, for example, an association probe or request, to the AP 104. In some aspects, the AP 104 may use backhaul services, for example, to communicate with a larger network, such as the Internet or a public switched telephone network (PSTN).

In some examples, the STA 114 may include one or more components (or circuits) for performing various functions. The STA 114 includes a receiver 133 and a transmitter 135. The receiver 133 may be configured to perform any receiving function described herein with respect to the STA 114. In some examples, the receiver 133 may be configured to receive a page monitoring schedule message (e.g., a page monitoring schedule negotiation response message) as described herein. For example, the receiver 133 may be configured to receive a page monitoring schedule message transmitted by a transmitter of an AP (e.g., transmitter 129 of the AP 104). The receiver 133 may be configured to receive one or more pages. For example, the receiver 133 may be configured to receive one or more pages transmitted by a transmitter of an AP (e.g., transmitter 129 of the AP 104). The transmitter 135 may be configured to perform any transmitting function described herein with respect to the STA 114. In some examples, the transmitter 135 may be configured to transmit a page monitoring schedule message (e.g., a page monitoring schedule negotiation request message) as described herein. For example, the transmitter 135 may be configured to transmit a page monitoring schedule message to an AP to initiate a page monitoring schedule negotiation with the AP. The receiver 133 and the transmitter 135 may be combined into a transceiver 137. In such examples, the transceiver 131 may be configured to perform an receiving function and/or transmitting function described herein with respect to the STA 114.

In some examples, the STA 114 may include a page management component 126 configured to perform any processing (e.g., functions, steps, or the like) described herein with respect to page monitoring and/or page monitoring schedule negotiation. For example, the page management component 126 may be configured to determine an interval cycle to receive a page and an awake time period, where the awake time period is a maximum time period during which the STA 114 stays awake to receive the page, activate communication capability with an access point (e.g., AP 104) at a start time of a current cycle of the interval cycle, and maintain the communication capability with the access point to receive a page from the access point at least until the awake time period expires after the start time of the current interval cycle.

As another example, the page management component 126 may be configured to determine a first interval between a first page transmission time and a second page transmission time. A page transmission time may be a time at which the AP 104 is scheduled to transmit (e.g., broadcast) a page (i.e., a page transmission time may refer to a target page transmission time). In some examples, at least one page transmission time may exist between the first page transmission time and the second page transmission time. For example, a third page transmission time may exist between the first page transmission time and the second page transmission time. In other examples, at least N page transmission times may exist between the first page transmission time and the second page transmission time, where N is any integer value. The page management component 126 may be configured to cause the STA 114 to enter a first state during which the STA 114 is configured to monitor for a page transmission from the AP 104 based on the first interval for a first state time period.

In some examples, the first interval may be one interval of an interval cycle. For example, the first interval may be cyclical or otherwise repeat. In such an example, a subsequent first interval to the first interval between the first and second page transmission times may be between the second page transmission time and a fourth page transmission time. In some examples, at least one page transmission time may exist between the second page transmission time and the fourth page transmission time. For example, a fifth page transmission time may exist between the second page transmission time and the fourth page transmission time. In some examples, the first interval may have a start time and an end time.

Regarding the first interval between the first and second page transmission times, the start time of the first interval may be relative to the first page transmission time and the end time of the first interval may be relative to the second page transmission time. The end time of the first interval may be relative to the start time of the of the first state time period. The start time of the first state time period may be before the end time of the first interval.

Regarding the example subsequent first interval between the second and fourth page transmission times, the start time of the subsequent first interval may be relative to the second page transmission time and the end time of the subsequent first interval may be relative to the fourth page transmission time. The end time of the subsequent first interval may be relative to the start time of the of the first state time period. The start time of the first state time period may be before the end time of the subsequent first interval.

The page management component 126 may be configured to cause the STA 114 to enter a second state during which the STA 114 is disabled from monitoring for a page transmission from the AP 104 from the first state in response to a trigger event. In some examples, the trigger event may include reception of a page associated with the second page transmission time before expiration of the first state time period and/or expiration of the first state time period. In some examples, the STA 114 may enter the second state for the duration of the first interval. In other examples, the STA 114 may be configured to enter the second state for the duration of the first interval minus (1) an elapsed period of time from the start time of the first interval to the time at which the STA 114 enters the second state corresponding to the first state time period and (2) the amount of time the STA 114 is configured to initiate the first time period before the start time of the subsequent interval. For example, if the second page transmission time is at 100 time units, the start time of the first state time period may be at 98 time units (2 time units before the second page transmission time). The first state time period may be 10 time units in length, meaning that the first state time period expires at 108 time units. The STA 114 may receive the page corresponding to the second page transmission at 101 time units. The first interval may have a length of 100 time units, meaning that the subsequent first interval between the second and fourth page transmission times may also have a length of 100 time units. The start time of the first state time period for the subsequent first interval may be 198. In this example, the STA 114 may be configured to enter the second state for 90 time units, which is derived as follows in this example: 100−((108−100)+2).

In some examples, any device (e.g., STA 114) described herein as being disabled from monitoring for a page, page transmission, or the like may refer to the device having its communication capability deactivated, turned off, in power save mode, or the like. For example the receiver of such a device may be turned off, in power save mode, or the like. In these examples, any device (e.g., STA 114) described herein as being enabled to monitor for a page, page transmission, or the like may refer to the device having its communication capability activated, turned on, not in power save mode (e.g., in power consumption mode), or the like. For example, the receiver of such a device may be turned on, not in power save mode (e.g., in power consumption mode), or the like. In some examples, any device described herein as being disabled from monitoring for a page, page transmission, or the like may refer to the device being unavailable for monitoring for the page, page transmission, or the like. In these examples, any device (e.g., STA 114) described herein as being enabled to monitor for a page, page transmission, or the like may refer to the device being available for monitoring for the page, page transmission, or the like.

In other examples, the STA 114 may be configured to receive a page with the receiver 133 in both the first state (i.e., a page monitoring enabled state) and the second state (i.e., a page monitoring disabled state). However, when the STA 114 is configured to operate in the first state, the page management component 126 may be configured to monitor information received by the receiver 133; and, if an expected page is received, the page management component 126 may be configured to perform processing on the received page and/or perform one or more other processes based on reception of the page. In some examples, the page management component 126 may be configured to extract information from a received page. When the STA 114 is configured to operate in the second state, the page management component 126 may be configured to not monitor information received by the receiver 133. Otherwise described, the page management component 126 may be disabled from monitoring information received by the receiver 133.

In some examples, the STA 114 may be configured to receive, from the AP 104, a message including the first interval. In such examples, the page management component 126 may be configured to determine the first interval from the received message. In other examples, the STA 114 may be configured to transmit, to the AP 104, a first message including a second interval. In response, the STA 114 may be configured to receive, from the AP 104, a second message including the first interval. In such examples, to determine the first interval, the page management component 126 may be configured to determine the first interval from the received message. In some examples, the second interval may be equal to the first interval. In other examples, the second interval may be different from the first interval.

In some examples, the STA 114 may be configured to receive a page associated with the first page transmission time. The page management component 126 may be configured to cause the STA 114 to enter the second state for the duration of the interval in response to the reception of the page associated with the first page transmission time. In some examples, entering the first state may occur after entering the second state for the duration of the interval in response to the reception of the page associated with the first page transmission time.

In some examples, the STA 114 may be configured to a receive a page associated with the second page transmission time. The page associated with the second page transmission time may include information indicative of a schedule for communication with the AP 104. Otherwise described, the page associated with the second page transmission time may update or modify the page monitoring schedule associated with the first interval. The page associated with the second page transmission time may include information indicative of a change to the first interval. For example, the information indicative of a change to the first interval may include a new duration for the first interval. As another example, the information indicative of a change to the first interval may include the difference between the duration of the first interval and a new duration for the first interval. For example, if the first interval is being updated from 100 time units to 200 time units, the information indicative of the change to the first interval may include the new duration of 200 time units or the difference value of 100 time units (i.e., the difference between 200 time units and 100 time units).

In some examples, the AP 104 may include one or more components (or circuits) for performing various functions. The AP 104 includes a receiver 127 and a transmitter 129. The receiver 127 may be configured to perform any receiving function described herein with respect to the AP 104. In some examples, the receiver 127 may be configured to receive a page monitoring schedule message (e.g., a page monitoring schedule negotiation request message) as described herein. For example, the receiver 127 may be configured to receive a page monitoring schedule message transmitted by a transmitter of a STA (e.g., transmitter 135 of the STA 114). The transmitter 129 may be configured to perform any transmitting function described herein with respect to the AP 104. In some examples, the transmitter 129 may be configured to transmit a page monitoring schedule message (e.g., a page monitoring schedule negotiation response message) as described herein. For example, the transmitter 129 may be configured to transmit a page monitoring schedule message to a STA to establish a page monitoring schedule with the STA. In other examples, the AP 104 may be configured to transmit (e.g., broadcast) one or more pages. For example, the transmitter 129 may be configured to transmit (e.g., broadcast) one or more pages, which may be received by one or more APs. The receiver 127 and the transmitter 129 may be combined into a transceiver 131. In such examples, the transceiver 131 may be configured to perform an receiving function and/or transmitting function described herein with respect to the AP 104.

In some examples, the AP 104 may include a page management component 166 configured to perform any processing (e.g., functions, steps, or the like) described herein with respect to page monitoring and/or page monitoring schedule negotiation. For example, the page management component 166 may be configured to negotiate with a wireless device for an interval cycle and an awake time period, and receive the interval cycle and the awake time period from the wireless device. In an aspect, a start time of each cycle of the interval cycle is a time at which the wireless device activates communication capability with the AP 104 to receive a page from the AP 104 and the awake time period is a maximum time period during which the wireless device maintains the communication capability to receive the page from the AP 104.

As another example, the AP 104 may be configured to receive, from a STA (e.g., STA 114), a first message. The page management component 166 may be configured to determine a first interval based on the first message for establishing a schedule with the STA. The schedule may include the first interval between a first page transmission time and a second page transmission time. A page transmission time may be a time at which the AP 104 is scheduled to transmit (e.g., broadcast) a page. In some examples, at least one page transmission time may exist between the first page transmission time and the second page transmission time. For example, a third page transmission time may exist between the first page transmission time and the second page transmission time. In other examples, at least N page transmission times may exist between the first page transmission time and the second page transmission time, where N is any integer value. The AP 104 may be configured to transmit a second message including the first interval to the STA for establishing the schedule with the STA. In some examples, the first message may include a second interval. In some examples, the first interval may be equal to the second interval. In other examples, the first interval may be different from the second interval. In some examples, the first interval may have a start time and an end time. The start time of the first interval may be relative to the first page transmission time and the end time of the first interval may be relative to the second page transmission time.

In some examples, the AP 104 may be configured to broadcast a page associated with the second page transmission time. The page associated with the second page transmission time may include information indicative of a schedule for communication with the AP 104. The page associated with the second page transmission time may include information indicative of a change to the first interval. Otherwise described, the page associated with the second page transmission time may update or modify the page monitoring schedule associated with the first interval. For example, the information indicative of a change to the first interval may include a new duration for the first interval. As another example, the information indicative of a change to the first interval may include the difference between the duration of the first interval and a new duration for the first interval. For example, if the first interval is being updated from 100 time units to 200 time units, the information indicative of the change to the first interval may include the new duration of 200 time units or the difference value of 100 time units (i.e., the difference between 200 time units and 100 time units).

In some examples, a STA (e.g., a non-AP STA) may be configured to activate its communication capability with an AP at a wake time of every cycle of a wakeup cycle, and maintain the its communication capability with the AP at least for an awake time period during which the STA may be configured to receive a page from the AP. Otherwise described, a STA (e.g., STA 114) may be configured to enter, at the wake time of every cycle of the wakeup cycle, a first state for a first state time period during which the STA is configured to monitor for a page (which may also be referred to as a page transmission) from the AP. The STA may be configured to stay in the first state until the occurrence of a trigger event, such as the expiration of the awake time period or the reception of a page during the awake time period. As described herein, an awake state (i.e., a state during which the STA is configured to monitor for a page) may be referred to as a page monitoring enabled state. An awake time period may therefore be referred to as a page monitoring enabled state time period, a page monitoring time period, or the like. Similarly, a sleep or low power state (i.e. a state during which the STA is configured to not monitor for a page) may be referred to as a page monitoring disabled state.

In some examples, a page monitoring time period (which may also be referred to as an awake time period) may be a time period during which the STA (e.g., STA 114) monitors for a page from when the STA begins monitoring for the page. For example, when the page monitoring time period expires, the STA (e.g., STA 114) may be configured to deactivate its communication capability with the AP (e.g., AP 104), even if the STA has not received a page from the AP. Otherwise described, the STA may be configured to enter, from the first state (i.e., the page monitoring enabled state), a second state (i.e., a page monitoring disabled state) in response to a trigger event. When configured to operate in the second state, the STA is disabled from monitoring for a page from the AP. In some examples, the trigger event may include the expiration of the page monitoring time period or the reception of a page during the page monitoring time period. In some examples, the STA may activate its communication capability with the AP by waking up from a sleep mode. For example, the STA may enter, from the second state (e.g., sleep mode) during which the STA is configured to not monitor for a page from the AP, the first state during which the STA is configured to monitor for a page transmission from the AP. As another example, the STA may be configured to deactivate its communication capability with the AP by entering a sleep mode. As another example, the STA may be configured to deactivate its communication capability with the AP by participating in communication with another AP different from the AP with which its communication capability is deactivated or in communication with another network unrelated to the AP with which its communication capability is deactivated.

As described herein, reference to activation of a communication capability may refer to enablement of page monitoring, and reference to deactivation of a communication capability may refer to disablement of page monitoring. For example, while a STA (e.g., STA 114) may deactivate its communication capability with an AP (e.g., AP 104) as described herein, this deactivation may refer to the STA entering a page monitoring disabled state during which the STA is disabled from monitoring for a page from the AP. However, in some examples, the STA may be configured to communicate with the AP for other purposes and/or operations with the AP that excludes monitoring for a page from the AP. Therefore, in some examples, reference to a STA deactivating its communication capability with an AP does not mean that the STA cannot communicate with the AP; rather, it may mean that the STA does not monitor for a page at a time that the AP is configured to transmit the page.

As described herein, reference to monitoring for a page at a time (e.g., a page transmission time, a target page transmission time, or the like) may refer to monitoring for a page before, at, and/or after the time. For example, the STA (e.g., STA 114) may be configured to begin monitoring for a page before the time to help resolve or otherwise circumvent desynchronization between the STA and the AP (e.g., AP 104) that transmitted the page. The STA may be configured to monitor for the page from the start time of monitoring up to the time at which the page is expected to be received. In other examples, the STA may be configured to monitor for the page from the start time of monitoring to a time past the time at which the page is expected to be received. In other examples, the STA may be configured to begin monitoring for a page at the time at which the page is expected to be received and continue monitoring for a page for a time period following the start time of monitoring for the page. Similarly, reference to monitoring for a page associated with a time (e.g., a page transmission time, a target page transmission time, or the like) may refer to monitoring for the page before, at, and/or after the time. Similarly, reference to reception of a page associated with a time (e.g., a page transmission time, a target page transmission time, or the like) may refer to reception of the page before, at, or after the time.

As referenced above, the wakeup cycle (which may also be referred to as an interval cycle) may be based on a target page transmission time (TPTT). As used herein, the acronym TPTT may refer to TBTT where the page is a beacon. An interval cycle includes a cyclical or otherwise repeated interval. Each interval of the interval cycle is a period of time between two page transmission times, such as between two TPTTs. Each interval has a start time and an end time respectively associated with the two TPTTs. For example, an interval may be between a first TPTT and a second TPTT. In this example, the start time of the interval may be relative to the first TPTT and the end time of the interval may be relative to the second TPTT. A STA (e.g., STA 114) may be configured to monitor for a page associated with the first TPTT and a page associated with the second TPTT. Otherwise described, a STA may be configured to monitor for pages associated with the start and end times of each interval in an interval cycle.

As described herein, each interval of the interval cycle is a period of time between two page transmission times, such as between two TPTTs (e.g., a first TPTT and a second TPTT). One or more TPTTs may be between the first TPTT and the second TPTT (i.e., one or more two TPTTs may be between the two TPTTs respectively at the start and end of the interval). For example, an AP (e.g., AP 104) may be configured to transmit seven pages spaced apart by 50 time units, where pages 1, 2, 3, 4, 5, 6, and 7 may be transmitted at times 0, 50, 100, 150, 200, 250, and 300, respectively. A time unit may be any measurement of time, such as microseconds, milliseconds, seconds, or any other measurements of time. In this example, if the interval is 100 time units in length and time 0 is the first TPTT, then the second TPTT would be 100 resulting in the TPTT for page 2 being between the first and second TPTTs.

As described in more detail herein, a STA (e.g., STA 114) may be configured to negotiate a page monitoring schedule with an AP (e.g., AP 104). For example, the STA may be configured to negotiate the interval and/or the first TPTT at which the interval is to be applied (i.e., the chronological first TPTT in a sequence of TPTTs at which the interval is to be applied) associated with the page monitoring schedule with AP (e.g., AP 104). The first TPTT in an interval is to be distinguished from the first TPTT at which the interval is to be applied, the latter of which may also be called a start TPTT, an interval start TPTT, or the like. For example, while each interval may described as being between a first and second TPTT, the first TPTT (i.e., the start TPTT) of a sequence of TPTTs indicates the starting point at which the interval cycle begins. Subsequent to the first TPTT (i.e., the start TPTT) of the sequence of TPTTs, the interval may be applied one or more times in a cyclical manner. Each time the interval is repeated, the interval may be described as being between two TPTTs, such as being between a first TPTT and a second TPTT. However, the start TPTT is different from the first TPTT in these subsequent intervals in that the start TPTT is the first TPTT of a sequence of TPTTs to which the interval cycle begins and/or repeats.

In accordance with the techniques described herein, instead of being configured to monitor for pages 1-7 (i.e., all pages in the seven pages example above), the STA may be configured to monitor for pages 1, 3, 5, and 7 when the first TPTT (i.e., the start TPTT) at which the interval is applied is page 1 as a result of implementing the interval in accordance with the techniques described herein. In this example, the interval is cyclical in that it repeats following its expiration resulting in the STA not monitoring for one or more pages associated with the one or more TPTTs that fall within the interval. With respect to pages 1 and 3, the interval begins and ends at the TPTTs respectively associated with the pages 1 and 3. With respect to pages 3 and 5, the interval begins and ends at the TPTTs respectively associated with the pages 3 and 5. With respect to pages 5 and 7, the interval begins and ends at the TPTTs respectively associated with the pages 5 and 7. After page seven, the STA may be configured to monitor for every other page until the page monitoring schedule is revised or otherwise updated by the STA and/or the AP. In the event of being updated (e.g., through re-negotiating the page monitoring schedule, which may include repeating the techniques described herein with respect to setting up a page monitoring schedule), the start TPPT in the updated page monitoring schedule defines at which TPTT the updated interval is to be applied. Similarly, in an example where the interval is 200 time units instead of 100 time units with respect to the seven pages example above, then the STA may be configured to monitor for pages 1 and 5 when the first TPTT (i.e., the start TPTT) at which the interval is to be applied is page 1 in accordance with the techniques described herein. FIGS. 2-5 described below provide additional examples of the techniques described herein.

Figure 2:
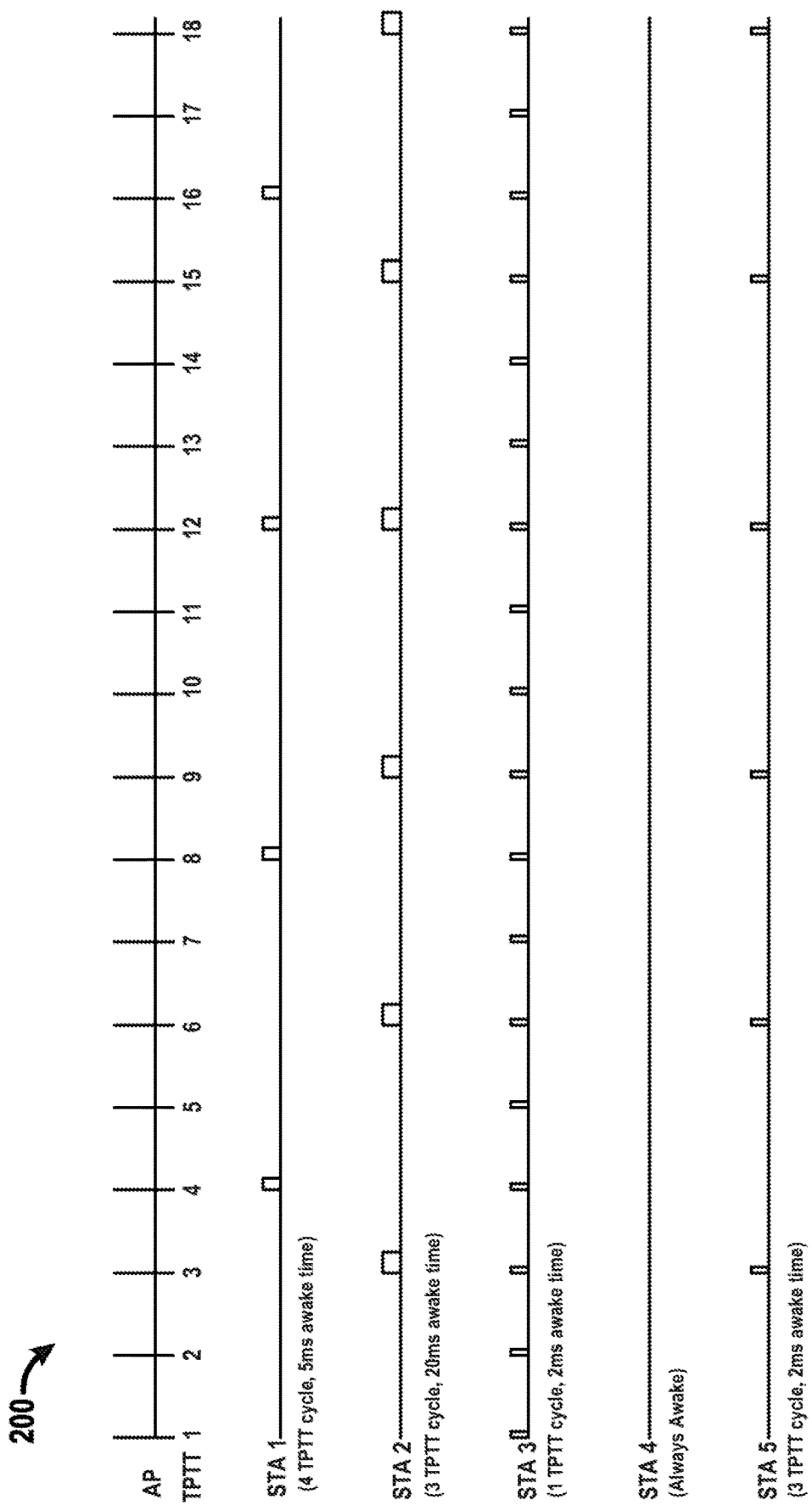
FIG. 2 is a an example timeline diagram illustrating communication of a page to several wireless stations in accordance with the techniques described herein.

FIG. 2 is an example timeline diagram 200 illustrating communication of a page to several STAs in accordance with the techniques of this disclosure. In the example diagram 200, the AP (e.g., AP 104) is associated with STAs 1-5. The wireless communication system 100 of FIG. 1 may include each of STAs 1-5 illustrated in FIG. 2. STA 1 may be configured to determine the interval cycle to be a 4 TPTT cycle, the start TPTT to be TPTT 4, and the page monitoring time period to be 5 msec. Thus, STA 1 may be configured to monitor for a page at every 4 TPTT (e.g., at $4^{th}$, $8^{th}$, $12^{th}$, and $15^{th}$ TPTT) for at least 5 msec to receive a page from the AP. In accordance with the techniques described herein, once STA 1 receives a page corresponding to each respective $4^{th}$ TPTT, such receipt may constitute a trigger event in which STA 1 then enters a state during which STA 1 is disabled from monitoring for a page. Therefore, while the awake time is shown as being a constant, this is for illustrative purposes only since the awake time may be cut short or otherwise stopped in response to a trigger event, such as receipt of a respective page associated with the respective awake time depicted. The same may be true for the other STAs illustrated in FIG. 2, as well as in FIGS. 3A, 3B, 4A, 4B, and 5. STA 2 may be configured to determine the interval cycle to be a 3 TPTT cycle, the start TPTT to be TPTT 3, and the page monitoring time period to be 20 msec. Thus, STA 2 may be configured to monitor for a page at every 3 TPTT (e.g., at $3^{th}$, $6^{th}$, $9^{th}$, $12^{th}$, $15^{th}$, and $18^{th}$ TPTT) for at least 20 msec to receive a page from the AP. As set forth above, once STA 2 receives a page corresponding to each respective $3^{rd}$ TPTT, such receipt may constitute a trigger event in which STA 2 then enters a state during which STA 2 is disabled from monitoring for a page. Therefore, while the awake time is shown as being a constant, this is for illustrative purposes only since the awake time may be cut short or otherwise stopped in response to a trigger event, such as receipt of a respective page associated with the respective awake time depicted. STA 3 may be configured to determine the interval cycle to be a 1 TPTT cycle (e.g., every TPTT), the start TPTT to be TPTT 1, and the page monitoring time period to be 2 msec. Thus, STA 3 may be configured to monitor for a page at every TPTT for at least 2 msec to receive a page from the AP. STA 4 has not determined the interval cycle and a page monitoring time period, and thus is always monitoring for a page from the AP. STA 5 may be configured to determine the interval cycle to be a 3 TPTT cycle, the start TPTT to be TPTT 3, and the page monitoring time period to be 2 msec. Thus, STA 5 may be configured to monitor for a page at every 3 TPTT (e.g., at $3^{th}$, $6^{th}$, $9^{th}$, $12^{th}$, $15^{th}$, and $18^{th}$ TPTT for at least 2 msec to receive a page from the AP.

FIGS. 3A and 3B are example diagrams illustrating retransmission of a page when a page is not received by a STA (e.g., STA 114) in accordance with the techniques of this disclosure. In the example diagrams of FIGS. 3A and 3B, the interval cycle is a 3 TPTT cycle, the start TPTT is TPTT 1 (i.e., the $1^{st}$ TPTT), and the page monitoring time period is 10 msec. Thus, in the example diagrams of FIGS. 3A and 3B, the STA may be configured to monitor for a page at every 3 TPTT (e.g., at $1^{st}$, $4^{th}$ and $7^{th}$ TPTT) for at least 10 msec to receive a page from the AP (e.g., AP 104). In the example diagram 300 of FIG. 3A, the STA may receive the page associated with the $1^{st}$ TPTT, but misses the page transmission associated with the $4^{th}$ TPTT because the page was transmitted after expiration of the page monitoring time period. In some examples, the STA may be configured to modify its page monitoring schedule with the AP to monitor for a page at a subsequent TPTT (e.g., the $5^{th}$ TPTT in this example), such as until the missed page is received and/or until a page associated with scheduled TPTT (i.e., a non-retransmitted page) is received. In the example diagram 300, the STA monitors for and receives a page associated with the $5^{th}$ TPTT. The STA also receives a page associated with the $7^{th}$ TPTT. In other examples, the STA may be configured to not modify its page monitoring schedule with the AP in response to missing a page at a scheduled TPTT. In such examples and with reference to the example diagram 300, instead of monitoring for and receiving the page associated with the $5^{th}$ TPTT, the next TPTT the STA would monitor for after the missed $4^{th}$ TPTT is the $7^{th}$ TPTT.

In the example diagram 350 of FIG. 3B, the STA may receive the page associated with the $1^{st}$ TPTT, but misses the page transmission associated with the $4^{th}$ TPTT as well as the retransmitted page associated with the $5^{th}$ TPTT (in an example where the STA is configured to modify its page monitoring schedule) because the page associated with the $4^{th}$ TPTT and the page associated with the $5^{th}$ TPTT was transmitted after expiration of the page monitoring time period. In some examples, the STA may be configured to modify its page monitoring schedule with the AP to monitor for a page associated with the subsequent TPTT (e.g., the $6^{th}$ TPTT in this example), such as until the missed page is received and/or until a page associated with scheduled TPTT (i.e., a non-retransmitted page) is received. In the example diagram 350, the STA receives a page associated with the $6^{th}$ TPTT. The STA also receives a page associated with the $7^{th}$ TPTT.

FIGS. 4A and 4B are example diagrams illustrating retransmission of a page when a page is not received by a STA (e.g., STA 114) in accordance with the techniques of this disclosure. In the example diagrams of FIGS. 4A and 4B, the interval cycle is a 3 TPTT cycle, the start TPTT is TPTT 1 (i.e., the $1^{st}$ TPTT), and the page monitoring time period is 10 msec. Thus, in the example diagrams of FIGS. 4A and 4B, the STA may be configured to monitor for a page at every 3 TPTT (e.g., at $1^{st}$, $4^{th}$ and $7^{th}$ TPTT) for at least 10 msec to receive a page from the AP (e.g., AP 104). In the example diagram 400 of FIG. 4A, the STA misses the page transmission associated with the $1^{st}$ TPTT because the page was transmitted after expiration of the page monitoring time period. In some examples, the STA may be configured to not modify its page monitoring schedule with the AP in response to missing a page at a scheduled TPTT. In the example of diagram 400 of FIG. 4A, the STA may be configured to subsequently monitor for a page associated with the end of the first interval (i.e., the interval that begins from the start TPTT, the $1^{st}$ TPTT in this example, and ends on the $4^{th}$ TPTT), which may also be described as the STA being configured to monitor for a page associated with the beginning of the second interval (i.e., the interval that begins on the $4^{th}$ TPTT and ends on the $7^{th}$ TPTT). In the example shown, the STA monitors for the page associated with the $4^{th}$ TPTT, and successfully receives the page associated with the $4^{th}$ TPTT. The STA also receives a page associated with the 7th TPTT.

In the example of diagram 450 of FIG. 4B, when the STA misses the page transmission associated with the $4^{th}$ TPTT, the STA may be configured to subsequently monitor for a page associated with the end of the first interval (i.e., the interval that begins from the start TPTT, the $1^{st}$ TPTT in this example, and ends on the $4^{th}$ TPTT), which may also be described as the STA being configured to monitor for a page associated with the beginning of the second interval (i.e., the interval that begins on the $4^{th}$ TPTT and ends on the $7^{th}$ TPTT). However, in the example diagram 450, the STA misses the page transmission associated with the $4^{th}$ TPTT as well. In this example, the STA may be configured to subsequently monitor for a page associated with the end of the second interval (i.e., the interval that begins from the $4^{th}$ TPTT and ends on the $7^{th}$ TPTT). In the example shown, the STA monitors for the page associated with the $7^{th}$ TPTT, and successfully receives the page associated with the $7^{th}$ TPTT.

Figure 5:
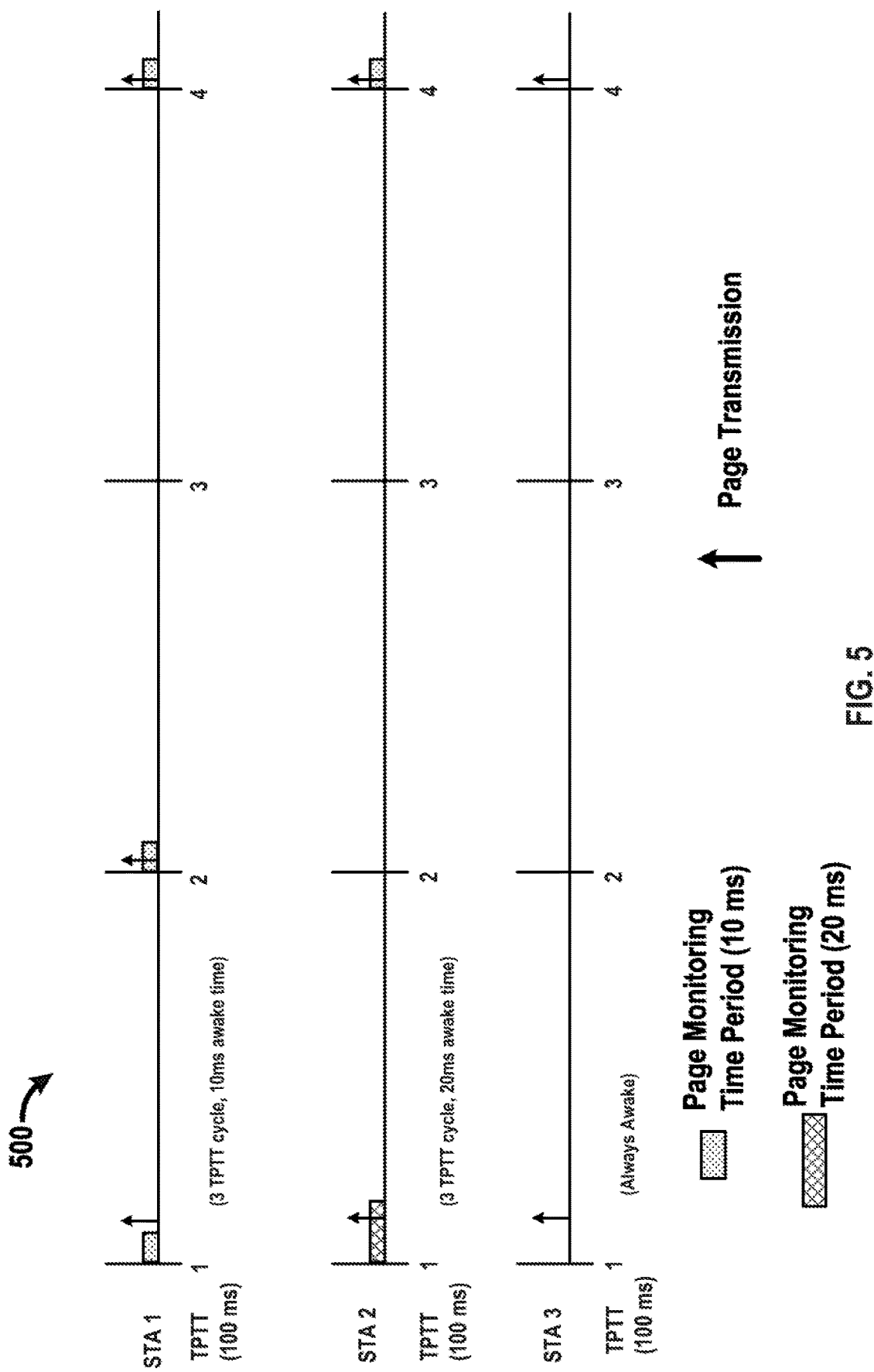
FIG. 5 is an example diagram illustrating retransmission of a page when a page is not received by one of several wireless stations in accordance with the techniques described herein.

FIG. 5 is an example diagram 500 illustrating retransmission of a page when a page is not received by one of several STAs in accordance with the techniques of this disclosure. The wireless communication system 100 of FIG. 1 may include each of STAs 1-3 illustrated in FIG. 5. STA 1 may be configured to determine the interval cycle to be a 3 TPTT cycle, the start TPTT is TPTT 1 (i.e., the $1^{st}$ TPTT), and the page monitoring time period to be 10 msec. Thus, STA 1 may be configured to monitor for a page at every 3 TPTT (e.g., at $1^{st}$ and $4^{th}$ TPTT) for at least 10 msec to receive a page from the AP (e.g., AP 104). STA 2 may be configured to determine the interval cycle to be a 3 TPTT cycle, the start TPTT is TPTT 1 (i.e., the $1^{st}$ TPTT), and the page monitor-ing time period to be 20 msec. Thus, STA 2 may be configured to monitor for a page at every 3 TPTT (e.g., at $1^{st}$ and $4^{th}$ TPTT) for at least 20 msec to receive a page from the AP (e.g., 104). STA 3 has not determined the interval cycle and the page monitoring time period, and thus is always awake to receive a page from the AP. Because each of STA 1 and STA 2 have communicated the respective interval cycle and the respective page monitoring time period, the AP (e.g., AP 104) may be configured to determine when each of STA 1 and STA 2 will be monitoring for a page. The AP (e.g., AP 104) also knows that STA 3 will be always awake to receive a page because, for example, no page monitoring schedule negotiation took place between the AP and STA 3). When the AP transmits a page at 15 ms (which is also referred to as msec or milliseconds) associated with the $1^{st}$ TPTT, STA 1 misses the transmission of the page because the page is transmitted after expiration of the 10 msec page monitoring time period resulting in STA 1 not monitoring for the page at the time the page is transmitted, whereas STA 2 and STA 3 receive and process the page. The page transmitted at the $1^{st}$ TPTT may include information specific to STA 1, information specific to STA 2, and information specific to STA 3. As described above, the information specific to STA 1, the information specific to STA 2, and the information specific to STA 3 may be the same. In such examples, the information may be described as being specific to STAs 1-3 because each of STAs 1-3 may be configured to process the information included in the page. In other examples, the information specific to STA 1, the information specific to STA 2, and the information specific to STA 3 may be different. The AP knows that STA 1 did not receive the page associated with the $1^{st}$ TPTT because of the page monitoring schedule setup between the AP and STA 1. Similarly, the AP knows that STA 2 received the page associated with the $1^{st}$ TPTT because of the page monitoring schedule setup between the AP and STA 2. The AP also knows that STA 3 received the page associated with the $1^{st}$ TPTT because the AP know that STA 3 is always monitoring for a page due to no page monitoring schedule having been setup between the AP and STA 3. Thus, when the AP transmits a page in a subsequent TPTT (i.e., the $2^{nd}$ TPTT in this example), the AP may include information specific to STA 1 in the page, and may not include information specific to STA 2 and STA 3 in the page. The example diagram 500 also illustrates that STA 1, STA 2, and STA 3 successfully received a page associated with the $4^{th}$ TPTT.

Referring again to FIG. 1 and in accordance with the techniques described herein, a STA (e.g., STA 114) may be configured to determine an interval cycle and a page monitoring time period. For example, the page management component 126 may be configured to determine an interval cycle and the page monitoring time period. In some examples, the STA may be configured to determine the interval cycle such that the interval cycle is aligned with the STA's listen interval. In some examples, a STA's listen interval may refer to a period of time (e.g., a maximum amount of time) that the STA may be in the second state during which the STA is disabled from monitoring for a page. In some examples, a STA may be configured to send a message to an AP that includes information indicative of the STA's listen interval during association with the AP. In this way, the AP knows the period of time (e.g., the maximum amount of time) that the STA may enter the second state during which the STA is disabled from monitoring for a page. The STA may be configured to negotiate a page monitoring schedule with the AP associated with the STA. The page monitoring schedule may include the interval corresponding to the STA's interval cycle and the first TPTT at which the interval is to be applied. For example, the page management component 126 may be configured to perform the page monitoring schedule negotiation for the STA 114 and the page management component 166 may be configured to perform the page monitoring schedule negotiation for the AP 104. To negotiate the page monitoring schedule with the AP 104, the STA 114 and the AP 104 may be configured to exchange information. For example, the STA 114 may be configured to negotiate the interval cycle and/or the start TPTT with the AP 104. During the page monitoring schedule negotiation, after determining the interval cycle, the start TPTT, and/or the page monitoring time period, the STA 114 may be configured to transmit the interval cycle, the start TPTT, and/or and the page monitoring time period to the AP 104. In such examples, the AP 104 may be configured to determine when the STA 114 is available to receive a page from the AP 104 based on the page monitoring schedule negotiation. In some examples, the AP 104 may be configured to determine when the STA 114 is available to receive a page from the AP 104 based on the interval cycle, the start TPTT, and/or the page monitoring time period received from the STA 114. In other examples, the AP 104 may be configured to instruct the STA to use an interval cycle, a start TPTT, and/or a page monitoring time period different from the interval cycle, the start TPTT, and/or the page monitoring time period that the STA 114 transmitted to the AP 104. In such examples, the AP 104 may be configured to determine when the STA 114 is available to receive a page from the AP 104 based on the interval cycle, the start TPTT, and/or the page monitoring time period that the AP 104 instructed the STA 114 to use for the interval cycle, the start TPTT, and/or the page monitoring time, respectively.

Figure 6A:
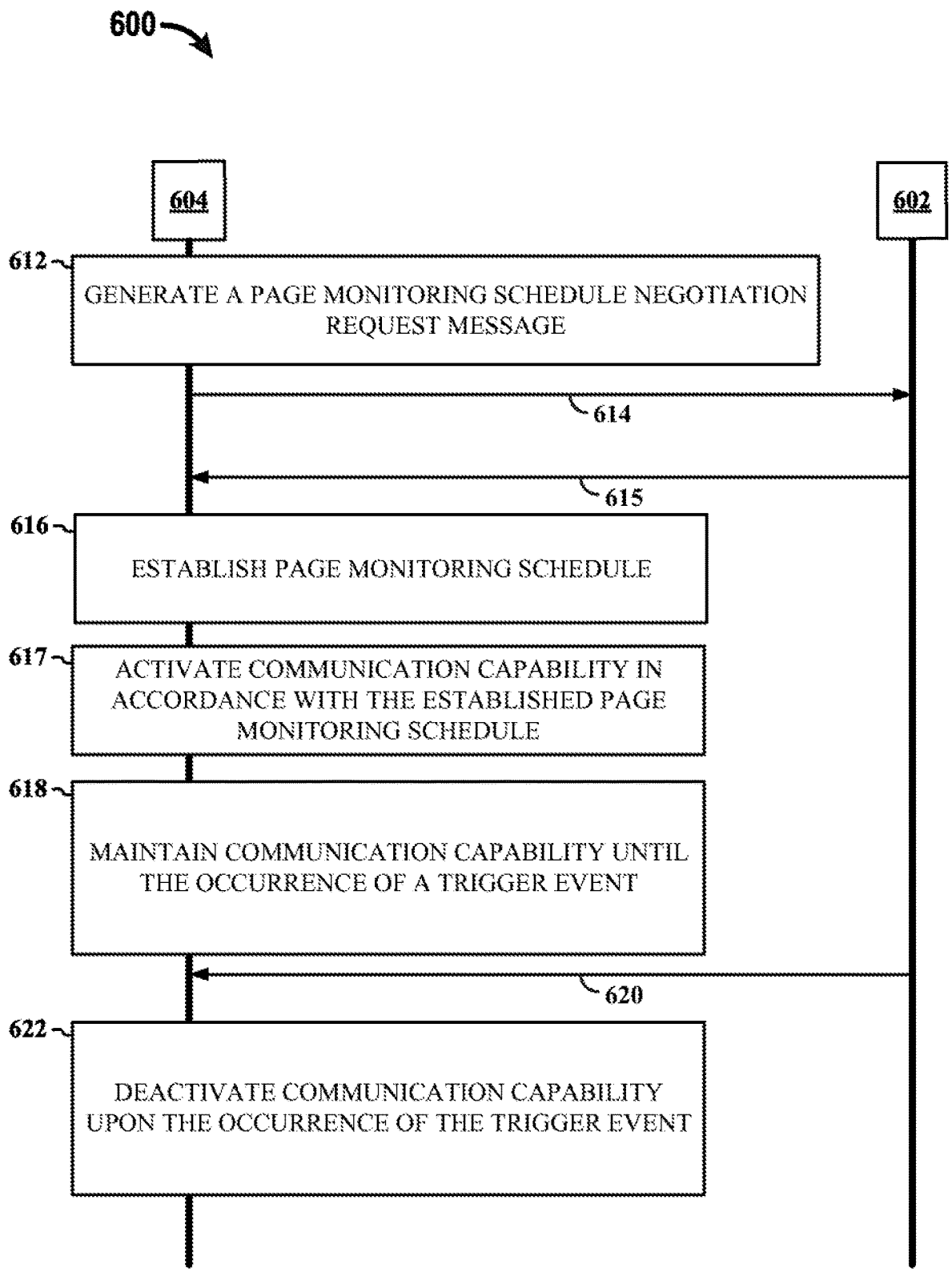
FIG. 6A is an example flow diagram illustrating an example interaction between a wireless station and an access point in accordance with the techniques described herein.
Figure 6B:
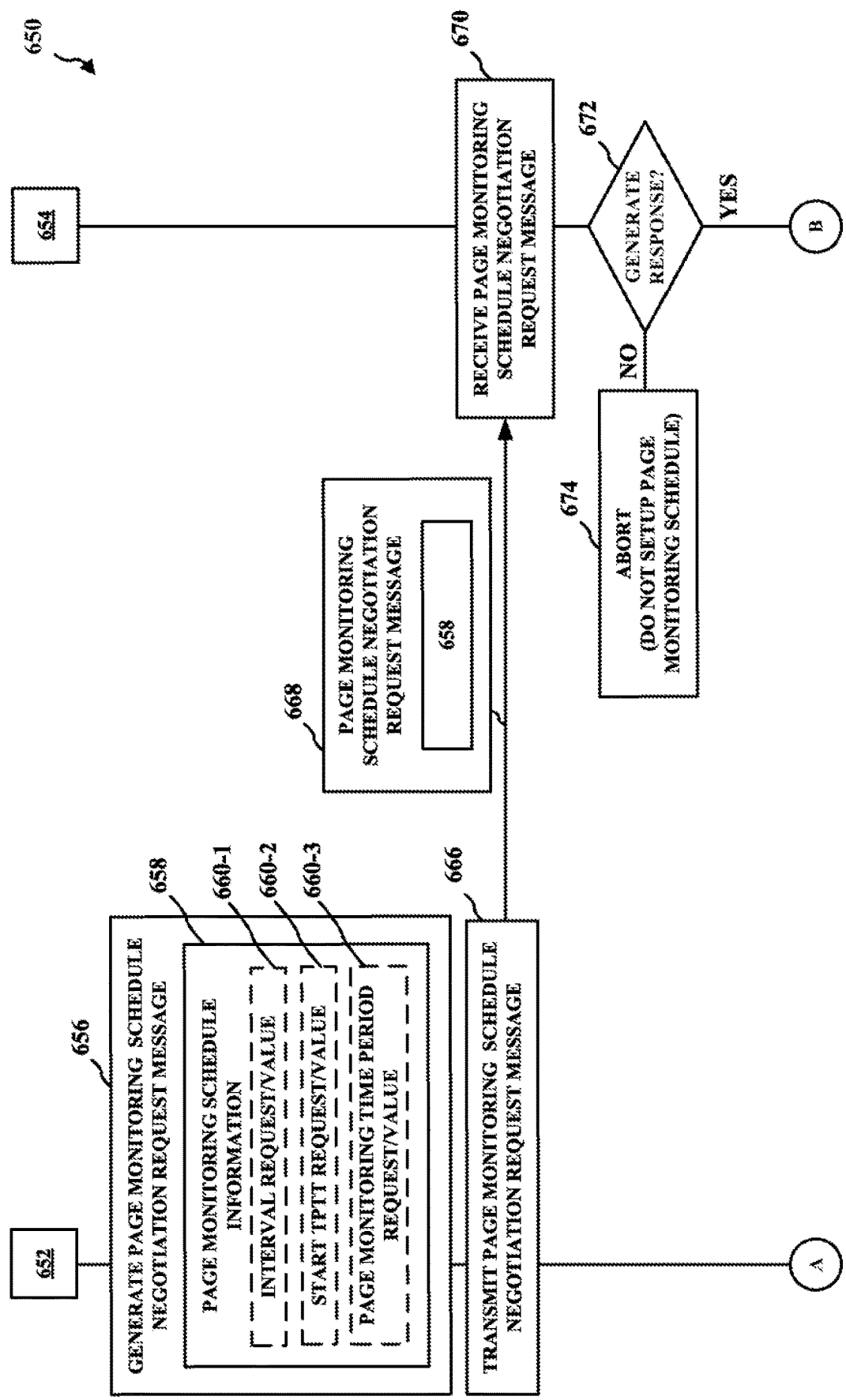
FIGS. 6B-6D is an example flow diagram illustrating an example interaction between a first device and a second device in accordance with the techniques described herein.
Figure 6C:
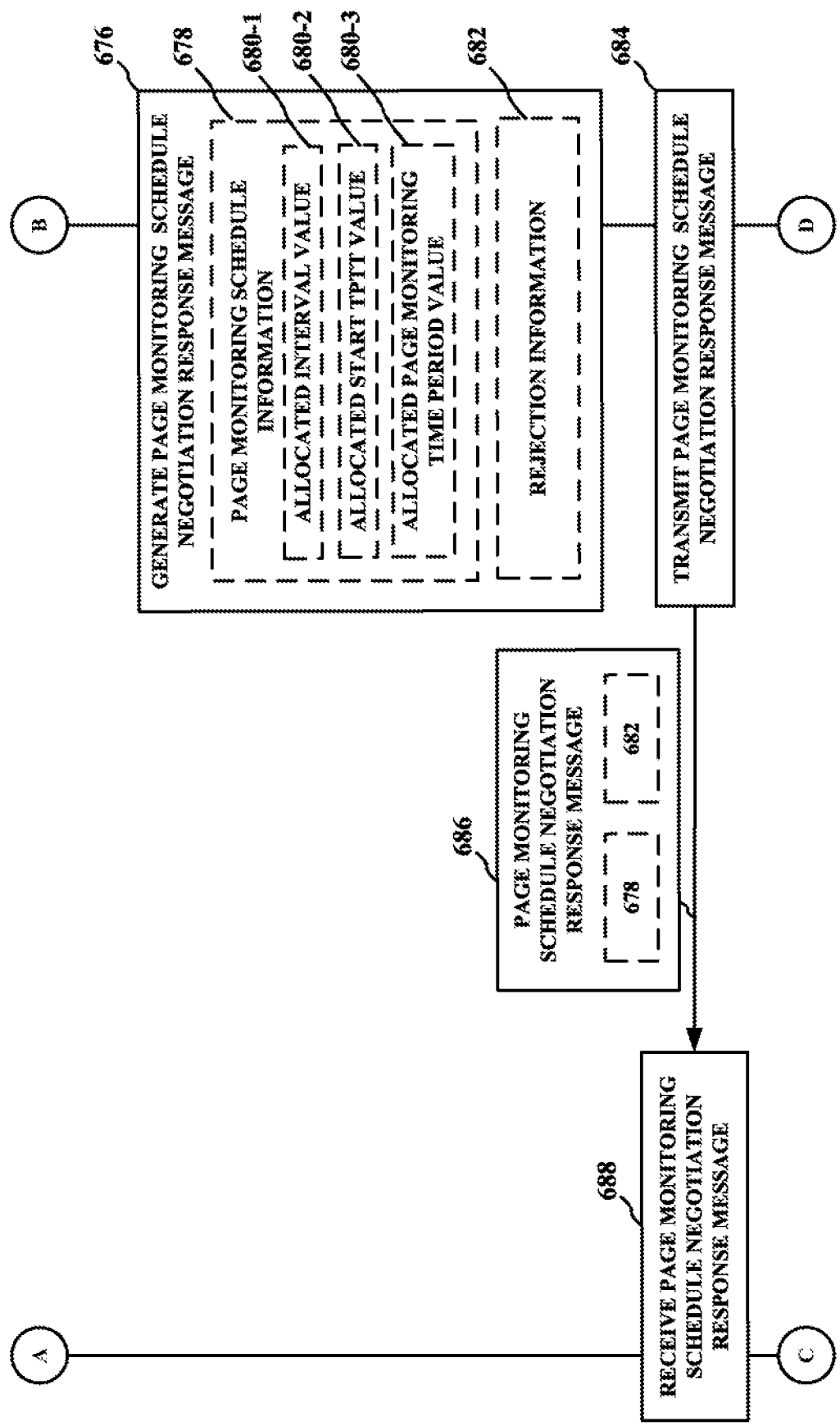
Figure 6D:
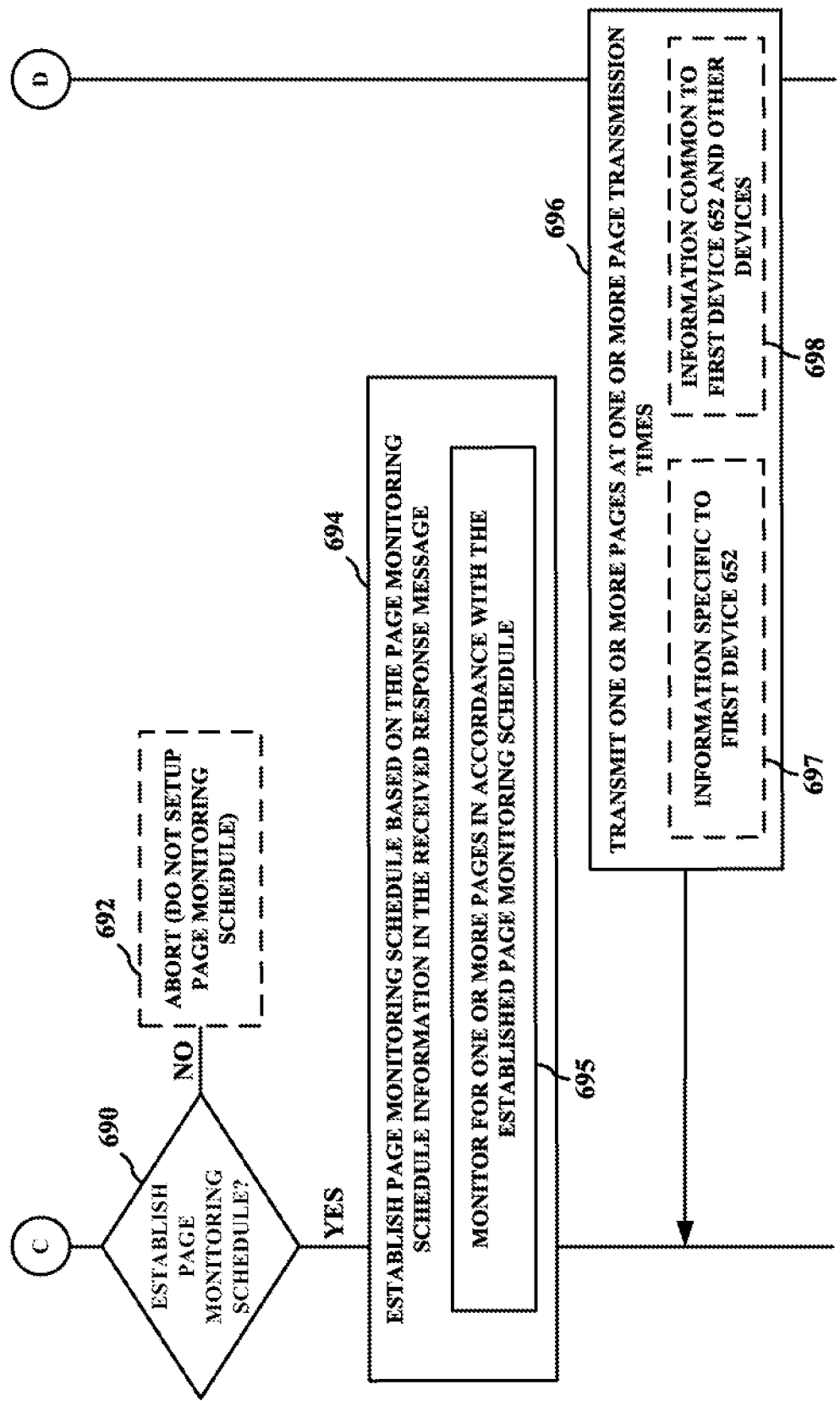

The page monitoring schedule negotiation may be based on a target wake time (TWT) negotiation mechanism or may be based on another negotiation mechanism. An example of a page monitoring negotiation and page monitoring schedule is depicted in FIG. 6A. FIGS. 6B-6D illustrate a more detailed example of the page monitoring negotiation and page monitoring schedule example depicted in FIG. 6A. In some examples, as part of the page monitoring schedule negotiation, the STA (e.g., STA 114) may be configured to transmit a page monitoring schedule negotiation request message to the AP (e.g., AP 104), and the AP may respond to the STA with a page monitoring schedule negotiation response message. In some examples, the page monitoring schedule negotiation request message may include a request for the AP to allocate or otherwise assign an interval and/or a first TPTT (i.e., the chronological first TPTT in a sequence of TPTTs at which the interval is to be applied) to establish a page monitoring schedule between the STA and the AP. In such examples, the page monitoring schedule negotiation response message may include an interval and/or a first TPTT (i.e., a start TPTT), but the page monitoring schedule negotiation request message does not include an interval and/or a first TPTT (i.e., a start TPTT). Upon receiving the page monitoring schedule negotiation response message from the AP, the STA may be configured to determine the interval and/or the first TPTT (i.e., the start TPTT) for the page monitoring schedule to be the interval and/or first TPTT (i.e., start TPTT) received in the page monitoring schedule negotiation response message. In this example, the interval and/or first TPTT (i.e., start TPTT) included in the page monitoring schedule negotiation response message may respectively refer to an allocated interval and an allocated first TPTT (i.e., an allocated start TPTT).

In other examples, the page monitoring schedule negotiation request message may include a suggested interval and/or a suggested start TPTT to establish a page monitoring schedule between the STA (e.g., STA 114) and the AP (e.g., AP 104). In such examples, the AP may be configured to accept the suggested interval and/or suggested start TPTT provided by the STA in the page monitoring schedule negotiation request message, or the AP may be configured to provide an interval different from the suggested interval and/or a start TPTT different from the suggested start TPTT. For example, the AP may be configured to respond to the STA's page monitoring schedule negotiation request message with a page monitoring schedule negotiation response message including an allocated interval and/or an allocated start TPTT. The allocated interval and/or the allocated start TPTT may be different from the suggested interval and/or suggested start TPTT received in the page monitoring schedule negotiation response message, respectively.

For example, in the event of accepting the STA's suggested interval and/or suggested start TPTT, the AP may be configured to respond to the STA's page monitoring schedule negotiation request message with a page monitoring schedule negotiation response message including an allocated interval that is the same as the STA's suggested interval and/or an allocated start TPTT that is the same as the STA's suggested start TPTT. Upon receiving the page monitoring schedule negotiation response message from the AP, the STA may be configured to determine the interval and/or the start TPTT for the page monitoring schedule to be the allocated interval and/or the allocated start TPTT received in the page monitoring schedule negotiation response message. As another example, in the event of not accepting the STA's suggested interval and/or suggested start TPTT, the AP may be configured to respond to the STA's page monitoring schedule negotiation request message with a page monitoring schedule negotiation response message including an allocated interval that is different from the STA's suggested interval and/or an allocated start TPTT that is different from the STA's suggested start TPTT. Upon receiving the page monitoring schedule negotiation response message from the AP, the STA may be configured to determine the interval and/or the start TPTT for the page monitoring schedule to be the allocated interval and/or the allocated start TPTT received in the page monitoring schedule negotiation response message. In some examples, the AP may be configured to accept the interval suggested by the STA but provide a start TPTT different from the start TPTT suggested by the STA. In other examples, the AP may be configured to accept the start TPTT suggested by the STA but provide an interval different from the interval suggested by the STA. In other examples, the AP may be configured to accept both suggestions (i.e., the interval and the start TPTT) by the STA. In other examples, the AP may be configured to provide a different interval and a different start TPTT relative to the suggestions provided by the STA.

In other examples, the page monitoring schedule negotiation request message may include a demanded interval and/or a demanded start TPTT to establish a page monitoring schedule between the STA (e.g., STA 114) and the AP (e.g., AP 104). In such examples, the AP may be configured to accept the demanded interval and/or demanded start TPTT provided by the STA in the page monitoring schedule negotiation request message, or the AP may be configured to reject the page monitoring schedule request. For example, in the event of accepting the STA's demanded interval and/or demanded start TPTT, the AP may be configured to respond to the STA's page monitoring schedule negotiation request message with a page monitoring schedule negotiation response message including an allocated interval that is the same as the STA's demanded interval and/or an allocated start TPTT that is the same as the STA's demanded start TPTT. Upon receiving the page monitoring schedule negotiation response message from the AP, the STA may be configured to determine the interval and/or the start TPTT for the page monitoring schedule to be the allocated interval and/or the allocated start TPTT received in the page monitoring schedule negotiation response message. As another example, in the event of not accepting the STA's demanded interval and/or demanded start TPTT, the AP may be configured to not schedule a page monitoring schedule with the STA.

In some examples, the AP (e.g., AP 104) may be configured to transmit a message to the STA (e.g., STA 114) indicative that the demanded interval and/or demanded start TPTT was rejected and that a page monitoring schedule has not been setup. In such examples, the message may be referred to as a page monitoring schedule negotiation rejection message. In such examples, the STA may respond to the page monitoring schedule negotiation rejection message with a new page monitoring schedule negotiation request message. In one example, the new page monitoring schedule negotiation request message may include a suggested interval and/or a suggested start TPTT. In another example, the new page monitoring schedule negotiation request message may include a different demanded interval and/or a different demanded start TPTT relative to the demanded interval and/or demanded start TPTT that were rejected. In another example, the new page monitoring schedule negotiation request message may not include interval and/or start TPTT values. In other examples, the AP may be configured to refrain from transmitting any message indicative that the demanded interval and/or demanded start TPTT was rejected. In such examples, the STA may be configured to determine that the demanded interval and/or demanded start TPTT was rejected in response to a trigger event. In some examples, the trigger event may include expiration of a rejection time period before reception of a page monitoring schedule negotiation response message is received from the STA to which the page monitoring schedule negotiation request message was transmitted. The STA may be configured to initiate the rejection time period upon transmitting the page monitoring schedule negotiation request message to the AP. Upon determining that a page monitoring schedule negotiation response message has not been received before expiration of the rejection time period, the STA may be configured to transmit a new page monitoring schedule negotiation request message as described above.

In some examples, a STA (e.g., STA 114) may be configured to determine the page monitoring time period during which the STA is configured to monitor for a page transmitted by an AP at a TPTT. For example, the page management component 126 may be configured to determine the page monitoring time period. In some examples, the page management component 126 may be configured to determine the page monitoring time period to be a default time period. The default time period may be X time units, where X may be any value. In other examples, the page management component 126 may be configured to determine the page monitoring time period based on the length of the interval in the interval cycle. In such examples, the page monitoring time period may be Y time units, where Y is a percentage (e.g., 5%, 10%, or any other percentage) of the length of the interval. In other examples, the page management component 126 may be configured to determine a length of the page monitoring time period based on one or more factors. The one or more factors may include the STA's configuration, the STA's power state, a current channel condition for communication between the STA and the AP, or any other factor.

For example, if the length of the page monitoring time period is determined based on the STA 114's configuration, the configuration may specify that the length of the page monitoring time period is a predetermined value (i.e., a default value or a fixed value). Otherwise described, the page management component 126 may be configured to determine the length of the page monitoring time period to be a default value (which may be referred to a fixed value) specified by the configuration of the STA 114. The configuration of the STA 114 corresponding to the length of the page monitoring time period may be stored in a memory accessible by the page management component 126.

As another example, if the length of the page monitoring time period is determined based on the STA 114's power state and the STA 114's power state is indicative of a low power state, the page management component 126 may be configured to determine the length of the page monitoring time period to be a first length. In some examples, a low power state may correspond to when the STA 114 has low battery power (e.g., has battery power at or below a threshold), when the STA 114 is in a power conservation mode, or the like. Conversely, if the STA 114's power state is indicative of a high power state, the page management component 126 may be configured to determine the length of the page monitoring time period to be a second length. The second length may be larger than the first length. In some examples, a high power state may correspond to when the STA 114 has high battery power (e.g., has battery power above a threshold), when the STA 114 is in a non-power conservation mode (e.g., a regular power mode or a high power consumption mode), when the STA 114 is plugged into a power outlet (e.g., when the STA is charging or maintaining full charge), or the like. The page management component 126 may be configured to determine the STA 114's power state.

As another example, the page management component 126 may be configured to determine a condition of a channel over which the STA 114 is configured to communicate with the AP 104. If the length of the page monitoring time period is determined based on the current channel condition and the current channel condition is indicative that the channel for communication between the STA 114 and the AP 104 is busy or congested, then the page management component 126 may be configured to determine the length of the page monitoring time period to be a first length. Conversely, if the current channel condition is indicative that the channel is not busy, then the page management component 126 may be configured to determine the length of the page monitoring time period to be a second length. In some examples, the second length may be smaller than the first length. In other examples, the second length may be larger than the first length. In some examples, the page management component 126 may be configured to determine the current channel condition of a channel for communication between the STA 114 and the AP 104. In other examples, the AP 104 may be configured to determine the current channel condition of a channel for communication between the STA 114 and the AP 104, and the AP 104 may be configured to transmit the current channel condition to the STA 114. For example, the AP 104 may be configured to transmit the current channel condition to the STA 114 during the page monitoring schedule negotiation. As an example, the page monitoring schedule negotiation response message may include the current channel condition determined by the AP 104.

In some examples, a STA (e.g., STA 114) may be configured to determine the length of the interval in an interval cycle of a page monitoring schedule. Reference to determining the length of the interval in the interval cycle may also be referred to as determining the interval or determining the interval cycle. For example, the page management component 126 may be configured to determine the length of the interval in the interval cycle. In some examples, the page management component 126 may be configured to determine the length of the interval in the interval cycle based on one or more factors. The one or more factors may include the STA's configuration, the STA's power state, a current channel condition for communication between the STA and the AP, or any other factor.

For example, if the length of the interval in the interval cycle is determined based on the STA 114's configuration, the configuration may specify that the length of the interval is a predetermined value (i.e., a default value or a fixed value). Otherwise described, the page management component 126 may be configured to determine the length of the interval in the interval cycle to be a default value (which may be referred to a fixed value) specified by the configuration of the STA 114. The configuration of the STA 114 corresponding to the length of the interval in the interval cycle may be stored in a memory accessible by the page management component 126.

As another example, if the length of the interval in the interval cycle is determined based on the STA's power state and the STA's power state is indicative of a low power state, the page management component 126 may be configured to determine the length of the interval in the interval cycle to be a first length. In some examples, a low power state may correspond to when the STA 114 has low battery power (e.g., has battery power at or below a threshold), when the STA 114 is in a power conservation mode, or the like. Conversely, if the STA 114's power state is indicative of a high power state, the page management component 126 may be configured to determine the length of the interval in the interval cycle to be a second length. The second length may be smaller than the first length. In some examples, a high power state may correspond to when the STA 114 has high battery power (e.g., has battery power above a threshold), when the STA 114 is in a non-power conservation mode (e.g., a regular power mode or a high power consumption mode), when the STA 114 is plugged into a power outlet (e.g., when the STA is charging or maintaining full charge), or the like. As one example, the page management component 126 may be configured to set the interval cycle to be every 8 TPTT when the STA 114 is in a low power state, and may be configured to set the interval cycle to be every 4 TPTT when the STA 114 is in a high power state.

As another example, the page management component 126 may be configured to determine a condition of a channel over which the STA 114 is configured to communicate with the AP 104. If the length of the interval in the interval cycle is determined based on the current channel condition and the current channel condition is indicative that the channel for communication between the STA 114 and the AP 104 is busy or congested, then the page management component 126 may be configured to determine the length of the interval in the interval cycle to be a first length. Conversely, if the current channel condition is indicative that the channel is not busy, then the page management component 126 may be configured to determine the length of the interval in the interval cycle to be a second length. In some examples, the second length may be smaller than the first length. In other examples, the second length may be larger than the first length. In some examples, the page management component 126 may be configured to determine the current channel condition of a channel for communication between the STA 114 and the AP 104. In other examples, the AP 104 may be configured to determine the current channel condition of a channel for communication between the STA 114 and the AP 104, and the AP 104 may be configured to transmit the current channel condition to the STA 114. For example, the AP 104 may be configured to transmit the current channel condition to the STA 114 during the page monitoring schedule negotiation. As an example, the page monitoring schedule negotiation response message may include the current channel condition determined by the AP 104.

As described herein, the interval cycle includes a cyclical or otherwise repeated interval, meaning that the page monitoring time period may also be cyclical or otherwise repeated at least in so far as the time at which the page monitoring time period is initiated. The STA (e.g., STA 114) may be configured to monitor for pages associated with the start and end times of each interval in an interval cycle. The end time of an interval preceding a subsequent interval may be the same as the start time of the subsequent interval. Therefore, reference to initiating the page monitoring time period at times corresponding to overlapping times (e.g., the end time of a preceding interval and the start time of the subsequent interval) does not mean that the page monitoring time period is initiated twice (i.e., a first initiation at a time corresponding to the end time of the preceding interval and a second initiation at a time corresponding to the start time of the subsequent interval); rather, the page monitoring time period is initiated once at a time that corresponds to both the end time of the preceding interval and the start time of the subsequent interval. The STA (e.g., the page management component 126 of the STA 114) may be configured to initiate the page monitoring time period at a time associated with the start time and at a time associated with the end time of each interval. As described above, the page monitoring time period may be fixed or dynamic, meaning that the length of the page monitoring time period may be the same at each initiation in some examples, or the length of the page monitoring time period may be the same for one or more initiations and different for one or more initiations. In some examples, the STA (e.g., the page management component 126 of the STA 114) may be configured to initiate the page monitoring time period before, at, or after the start time of an interval. Similarly, the STA (e.g., the page management component 126 of the STA 114) may be configured to initiate the page monitoring time period before, at, or after the end time of an interval. For example, the STA may be configured to initiate the page monitoring time period before the start time and/or the end time of each interval to address desynchronization between the STA and the AP. For example, the beginning time of an interval may correspond to a first TPTT at N time units (where N is any number) and the end time of the interval may correspond to a second TPTT at N+M time units (where M is the duration of the interval). The STA (e.g., the page management component 126 of the STA 114) may be configured to initiate the page monitoring time period at (N−Z) time units and at ((N+M)−Z) time units, where Z is equal to any number. Otherwise described, the STA (e.g., the page management component 126 of the STA 114) may be configured to initiate the page monitoring time period before the TPTT associated with the start time and end time of each interval.

Based on the interval cycle of the STA (e.g., STA 114), the AP (e.g., AP 104) may be configured to send information specific to the STA, such as certain indications/instructions (e.g., traffic announcement, change of TWT schedule, etc.) to the STA in appropriate pages. For example, if a first STA activates its communication capability with an AP at TPTT 1 and a second STA activates its communication capability with the AP at TPTT 2, the AP may transmit information specific to the first STA in a page transmitted at TPTT 1 and may transmit information specific to the second STA in a page transmitted at TPTT 2. The AP may be aware that a particular STA did not receive a page, and thus may determine that the AP cannot perform certain tasks (e.g., scheduling, transmitting traffic) with the STA.

As another example, with respect to FIG. 2, the information specific to the STA may include information indicative of a schedule for communication with the AP and/or information indicative of a change to one or more parameters of a page monitoring schedule setup with the AP for a particular STA (e.g., the length of the interval, the start TPTT, and/or the page monitoring time period). In some examples, the schedule for communication with the AP may be the page monitoring schedule. In other examples, the schedule for communication with the AP may be a schedule different from the page monitoring schedule, such as a schedule for an uplink transmission to the AP from the STA and/or a downlink transmission from the AP to the STA. For example, the AP may be configured to consolidate information transmitted in its beacons by determining which STAs share a common page (i.e., which STAs monitor for a common page). In the example of FIG. 2, the AP (e.g., AP 104) may be configured to determine that STAs 1, 2, 3, and 4 each monitor for the page associated with TPTT 12. Therefore, the AP may be configured to provide a system wide update (i.e., an update relevant to all STAs) in as few pages as possible. In the example of FIG. 2, such a system wide update may be provided in the page associated with the TPTT 12.

As discussed herein, because the STA (e.g., STA 114) may be configured to provide the interval cycle, the start TPTT, and/or the page monitoring time period to the AP (e.g., AP 104), the AP can determine if the STA was able to receive a page transmitted from the AP. For example, if the page was delayed (e.g., due to network congestion) and thus the AP transmitted the page after expiration of the page monitoring time period of the STA, then the AP is configured to determine that the STA missed the transmission of the page and thus the STA will not act on any instructions provided by the page. Instructions provided by the page may include, for example, an instruction to remain awake to receive buffered traffic, an instruction to change a negotiated TWT schedule an instruction to change to a broadcast TWT schedule, or any other instruction on which the STA may be configured to operate.

FIG. 6A is an example flow diagram 600 illustrating an interaction between a wireless station (e.g., STA 604) and an access point (e.g., AP 602). The STA 604 may be the STA 114 in the example of FIG. 1. The AP 602 may be the AP 104 in the example of FIG. 1. At block 612, the STA 604 may be configured to generate a page monitoring schedule negotiation request message. In some examples, to generate the message, the STA 604 may be configured to determine page monitoring schedule information (e.g., an interval cycle, a start TPTT, and/or a page monitoring time period for the STA 604) for including in the page monitoring schedule negotiation request message. In some examples, the STA 604 may be configured to suggest or demand a value for one or more of the interval cycle, the start TPTT, and/or the page monitoring time period by including such respective values in the page monitoring schedule negotiation request message. In other examples, the STA 604 may be configured to generate the page monitoring schedule negotiation request message without including any specific value for the interval cycle, the start TPTT, and/or the page monitoring time period.

At 614, the STA 604 is illustrated as transmitting the page monitoring schedule negotiation request message to the AP 602. In some examples, the page monitoring schedule negotiation request message may include the determined page monitoring schedule information, such as one or more suggested values and/or one or more demanded values. In some examples, the STA 604 may be configured to perform steps 612 and 614 during a page monitoring schedule negotiation between the STA 604 and the AP 602.

At 615, the AP 602 is illustrated as transmitting the page monitoring schedule negotiation response message to the STA 604. The page monitoring schedule negotiation response message includes page monitoring schedule information (e.g., an interval cycle, a start TPTT, and/or a page monitoring time period. In some examples, the page monitoring schedule information included in the page monitoring schedule negotiation response includes the same values for the interval cycle, the start TPTT, and/or the page monitoring time period included in the page monitoring schedule negotiation request message transmitted at 614. In other examples, the page monitoring schedule information included in the page monitoring schedule negotiation response includes different values for the interval cycle, the start TPTT, and/or the page monitoring time period compared to the values included in the page monitoring schedule negotiation request message transmitted at 614.

At block 616, the STA 604 may be configured to establish a page monitoring schedule based on the page monitoring schedule negotiation request message transmitted by the AP 602 at 614. For example, the STA 604 may be configured to establish the page monitoring schedule using the page monitoring schedule information included in the page monitoring schedule negotiation response message, which may be the same or different from the page monitoring schedule information included in the page monitoring schedule negotiation request message. The established page monitoring schedule may include an interval cycle, a start TPTT, and/or a page monitoring time period as described herein.

At block 617, the STA 604 may be configured to activate its communication capability with the AP 602 in accordance with the established page monitoring schedule. For example, the STA 604 may be configured to activate its communication capability with the AP 602 at a start time corresponding to the interval cycle included in the page monitoring schedule negotiation response message. Otherwise described, at block 617, the STA 604 may be configured to enter, at the start time of the interval cycle, a first state for a first state time period during which the STA 604 is configured to monitor for a page from the AP 602.

At block 618, the STA 604 may be configured to maintain its communication capability with the AP 602 until the occurrence of a trigger event, such as the expiration of a page monitoring time period or the reception of a page during the page monitoring time period. The AP 602 is illustrated as transmitting a page at 620. In some examples, if the AP 602 transmits the page at 620 before the page monitoring time period of the established page monitoring schedule expires, the STA 604 receives the page. At block 622, the STA 604 may be configured to deactivate its communication capability with the AP 602 upon the occurrence of the trigger event, such as the expiration of the page monitoring time period or the reception of a page during the page monitoring time period. Otherwise described, the STA 604 may be configured to enter, from the first state (i.e., the page monitoring enabled state), a second state (i.e., a page monitoring disabled state) in response to a trigger event. When configured to operate in the second state, the STA 604 is disabled from monitoring for a page from the AP 602. In some examples, the trigger event may include the expiration of the page monitoring time period or the reception of a page during the page monitoring time period.

FIGS. 6B-6D illustrates an example flow diagram 650 between a first device 652 (e.g., a STA described herein, such as the STA 114) in communication with a second device 654 (e.g., an AP described herein, such as the AP 104) in accordance with the techniques described herein. In other examples, one or more techniques described herein may be added to the flow diagram 650 and/or one or more techniques depicted in the flow diagram may be removed.

In the example of FIGS. 6B-6D, at block 656, the first device 652 may be configured to generate a page monitoring schedule negotiation request message. The page monitoring schedule negotiation request message may include page monitoring schedule information 658. The page monitoring schedule information 658 may include information corresponding to one or more page monitoring parameters 660. In the example shown, the one or more page monitoring parameters 660 include: an interval request/value 660-1, a start TPTT request/value 660-2, and/or a page monitoring time period request/value 660-3. At block 666, the first device 652 may be configured to transmit the page monitoring schedule negotiation request message to the second device 654. Block 668 shows the page monitoring schedule negotiation request message being transmitted to the second device 654. At block 670, the second device 654 may be configured to receive the page monitoring schedule negotiation request message.

In some examples, the first device 652 may be configured to generate the page monitoring schedule negotiation request message in response to a trigger event. For example, the first device 652 may be configured to determine the presence of the trigger event; and, based on the presence of the trigger event, generate the page monitoring schedule negotiation request message. In some examples, the trigger event includes the determination to establish a page monitoring schedule with the second device 654. The first device 652 may be configured to establish the page monitoring schedule with the second device 654 based on one or more factors, such as the power state of the first device 652 to reduce power consumption or a current channel condition for communication between the first device 652 and the second device 654. For example, in the event that remaining battery life reaches or drops below a threshold value (e.g., X % of battery life consumed or X % of battery life remaining, where X is a positive value), the first device 652 may be configured to determine to establish the page monitoring schedule with the second device 654. In response to this trigger event, the first device 652 may be configured to generate the page monitoring schedule negotiation request message. As another example, the first device 652 may be configured to establish the page monitoring schedule when the current channel condition for communication with the second device 654 is busy or congested. By implementing a page monitoring schedule, the first device 652 may reduce network congestion.

In some examples, the first device 652 may be configured to initiate an association procedure with the second device 654. In such examples, the trigger event may include the initiation of the association procedure with the second device 654. In some examples, an association procedure may refer to a procedure in which two apparatuses (e.g., the first device 652 and the second device 654) share information about themselves for establishing a connection or the like. In some examples, the first device 652 may be configured to complete an association procedure with the second device 654. In such examples, the trigger event may include the completion of the association procedure with the second device 654. In some examples, the first device 652 may be configured to receive an association procedure request, such as from the second device 654. In such examples, the trigger event may include the reception of the association procedure request. In some examples, the first device 652 may be configured to receive a request for page monitoring schedule information 658, such as from the second device 654. In such examples, the trigger event may include the reception of the request for the page monitoring schedule information 658.

Referring to the one or more page monitoring parameters 660 of the page monitoring schedule information 658, an interval request 660-1 includes information indicative of a request for the second device 654 to allocate an interval value for the interval cycle corresponding to the page monitoring schedule to be established with the second device 654. A start TPTT request 660-2 includes information indicative of a request for the second device 654 to allocate a start TPTT value for the interval cycle corresponding to the page monitoring schedule to be established with the second device 654. A page monitoring time period request 660-3 includes informative indicative of a request for the second device 654 to allocate a page monitoring time period value corresponding to the page monitoring schedule to be established with the second device 654.

In other examples, the one or more page monitoring parameters 660 may include one or more values instead of one or more requests. The page monitoring schedule information 658 may include only requests for parameter values, only suggested or demanded parameter values, or any combination thereof. An interval value 660-1 includes information indicative of a suggested interval value or a demanded interval value to establish a page monitoring schedule between the first device 652 and the second device 654. The page monitoring schedule information may include information indicative of whether a page monitoring schedule negotiation request message includes any suggested values, any demanded values, does not include any suggested values, does not include any demanded values, or any combination thereof.

A start TPTT request 660-2 includes information indicative of a suggested TPTT value or a demanded TPTT value to establish a page monitoring schedule between the first device 652 and the second device 654. A page monitoring time period request 660-3 includes informative indicative of a suggested page monitoring time period value or a demanded page monitoring time period value to establish a page monitoring schedule between the first device 652 and the second device 654. In some examples, the first device 652 may be configured to include a page monitoring time period value 660-3 to inform the second device 654 of what page monitoring time period will be used in the event of establishing a page monitoring schedule with the second device 654 (i.e., the second device 654 may not be configured to instruct the first device 652 to use a page monitoring time period different from the page monitoring time period included in the page monitoring schedule information 658. As used herein, a demanded value is a value that must be used to establish a page monitoring schedule with the first device 652, whereas a suggested value is a value that may but need not be used to establish a page monitoring schedule with the first device 652. For example, with a demanded value, the second device 654 may be disabled from allocating a value different from the demanded value (i.e., the second device 654 may be enabled to only allocate the demanded value or not establish a page monitoring schedule with the first device 652). However, with a suggested value, the second device 654 may be enabled to allocate the suggested value or a value different from the suggested value. As another example, with a request for a value (e.g., interval request 660-1, a start TPTT request 660-2, and/or a page monitoring time period request 660-3), the second device 654 may be enabled to allocate a value in response to the request for the value.

In some examples, the first device 652 may be configured to determine the page monitoring time period value 660-3 (i.e., the length of the page monitoring time period of the page monitoring schedule to be or otherwise sought to be established with the second device 654) to be a default time period. The default time period may be X time units, where X may be any value. In other examples, the first device 652 may be configured to determine the page monitoring time period value 660-3 based on the length of the interval value 660-1 in the interval cycle of the page monitoring schedule to be (or otherwise sought to be) established with the second device 654. In such examples, the page monitoring time period value 660-3 may be Y time units, where Y is a percentage (e.g., 5%, 10%, or any other percentage) of the length of the interval 660-3. In other examples, the first device 652 may be configured to determine the page monitoring time period value 660-3 based on one or more factors. The one or more factors may include the first device 652's configuration, the first device 652's power state, a current channel condition for communication between the first device 652 and the second device 654, or any other factor.

For example, if the page monitoring time period value 660-3 is determined based on the configuration of the first device 652, the configuration may specify that the page monitoring time period value 660-3 is a predetermined value (i.e., a default value or a fixed value). Otherwise described, the first device 652 may be configured to determine the page monitoring time period value 660-3 to be a default value (which may be referred to a fixed value) specified by the configuration of the first device 652. The configuration of the first device 652 corresponding to the page monitoring time period value (i.e. length) 660-3 may be stored in a memory of the first device 652. In such examples, the first device 652 may be configured to read the page monitoring time period value 660-3 from the memory to generate the page monitoring schedule negotiation request message including the page monitoring time period value 660-3.

As another example, if the page monitoring time period value 660-3 is determined based on the power state of the first device 652 and the power state is indicative of a low power state, the first device 652 may be configured to determine the page monitoring time period value 660-3 to be a first value (i.e., a first length). In some examples, a low power state may correspond to when the first device 652 has low battery power (e.g., has battery power at or below a threshold), when the first device 652 is in a power conservation mode, or the like. Conversely, if the first device 652's power state is indicative of a high power state, the first device 652 may be configured to determine the page monitoring time period value 660-3 to be a second value (i.e., a second length). The second value may be larger than the first value. In some examples, a high power state may correspond to when the first device 652 has high battery power (e.g., has battery power above a threshold), when the first device 652 is in a non-power conservation mode (e.g., a regular power mode or a high power consumption mode), when the first device 652 is plugged into a power outlet (e.g., when the first device is charging or maintaining full charge), or the like. The first device 652 may be configured to determine its power state. For example, the first device 652 may be configured to measure its power consumption, the amount of battery life consumed, the amount of battery life remaining, and/or one or more other factors described herein to determine its power state.

As another example, the first device 652 may be configured to determine a condition of a channel over which the first device 652 is configured to communicate with the second device 654. If the page monitoring time period value 660-3 is determined based on the current channel condition and the current channel condition is indicative that the channel for communication between the first device 652 and the second device 654 is busy or congested, then the first device 652 may be configured to determine the page monitoring time period value 660-3 to be a first value (i.e., a first length). Conversely, if the current channel condition is indicative that the channel is not busy, then the first device 652 may be configured to determine the page monitoring time period value 660-3 to be a second value (i.e., a second length). In some examples, the second value may be smaller than the first value. In other examples, the second value may be larger than the first value. In some examples, the first device 652 may be configured to determine the current channel condition of a channel for communication between the first device 652 and the second device 654. In other examples, the second device 654 may be configured to determine the current channel condition of a channel for communication between the first device 652 and the second device 654, and the second device 654 may be configured to transmit the current channel condition to the first device 652. For example, the second device 654 may be configured to transmit the current channel condition to the first device 652 during the page monitoring schedule negotiation. As an example, the page monitoring schedule negotiation response message may include the current channel condition determined by the second device 654.

In some examples, the first device 652 may be configured to determine the interval value 660-1 (i.e., the length of the interval in the interval cycle of the page monitoring schedule to be or otherwise sought to be established with the second device 654) to be a default time period. The default time period may be P time units, where P may be any value. In other examples, the first device 652 may be configured to determine the interval value 660-1 based on the number of pages to the first device desires to avoid monitoring. For example, if the second device 654 is configured to send a page every Q time units, the first device 652 may be configured to determine the interval value 660-1 to be N*Q, where N is an integer and N minus 1 equals the number of pages between each page transmission at the beginning and end of each interval in the interval cycle. In other examples, the first device 652 may be configured to determine the interval value 660-1 based on one or more factors. The one or more factors may include the first device 652's configuration, the first device 652's power state, a current channel condition for communication between the first device 652 and the second device 654, or any other factor.

For example, if the interval value 660-1 is determined based on the configuration of the first device 652, the configuration may specify that the interval value 660-1 is a predetermined value (i.e., a default value or a fixed value). Otherwise described, the first device 652 may be configured to determine the interval value 660-1 to be a default value (which may be referred to a fixed value) specified by the configuration of the first device 652. The configuration of the first device 652 corresponding to the interval value (i.e. length) 660-1 may be stored in a memory of the first device 652. In such examples, the first device 652 may be configured to read the interval value 660-1 from the memory to generate the page monitoring schedule negotiation request message including the interval value 660-1.

As another example, if the interval value 660-1 is determined based on the power state of the first device 652 and the power state is indicative of a low power state, the first device 652 may be configured to determine the interval value 660-1 to be a first value (i.e., a first length). In some examples, a low power state may correspond to when the first device 652 has low battery power (e.g., has battery power at or below a threshold), when the first device 652 is in a power conservation mode, or the like. Conversely, if the first device 652's power state is indicative of a high power state, the first device 652 may be configured to determine the interval value 660-1 to be a second value (i.e., a second length). The second value may be larger than the first value. In some examples, a high power state may correspond to when the first device 652 has high battery power (e.g., has battery power above a threshold), when the first device 652 is in a non-power conservation mode (e.g., a regular power mode or a high power consumption mode), when the first device 652 is plugged into a power outlet (e.g., when the first device is charging or maintaining full charge), or the like. The first device 652 may be configured to determine its power state. For example, the first device 652 may be configured to measure its power consumption, the amount of battery life consumed, the amount of battery life remaining, and/or one or more other factors described herein to determine its power state.

As another example, the first device 652 may be configured to determine a condition of a channel over which the first device 652 is configured to communicate with the second device 654. If the interval value 660-1 is determined based on the current channel condition and the current channel condition is indicative that the channel for communication between the first device 652 and the second device 654 is busy or congested, then the first device 652 may be configured to determine the interval value 660-1 to be a first value (i.e., a first length). Conversely, if the current channel condition is indicative that the channel is not busy, then the first device 652 may be configured to determine the interval value 660-1 to be a second value (i.e., a second length). In some examples, the second value may be smaller than the first value. In other examples, the second value may be larger than the first value. In some examples, the first device 652 may be configured to determine the current channel condition of a channel for communication between the first device 652 and the second device 654. In other examples, the second device 654 may be configured to determine the current channel condition of a channel for communication between the first device 652 and the second device 654, and the second device 654 may be configured to transmit the current channel condition to the first device 652. For example, the second device 654 may be configured to transmit the current channel condition to the first device 652 during the page monitoring schedule negotiation. As an example, the page monitoring schedule negotiation response message may include the current channel condition determined by the second device 654.

In some examples, the first device 652 may be configured to determine the start TPTT value 660-2 (i.e., the chronological first TPTT in a sequence of TPTTs at which the interval cycle of the page monitoring schedule to be established is to be applied) to be a default TPTT.

At block 672, the second device 654 may be configured to determine whether to generate a page monitoring schedule negotiation response message to the page monitoring schedule negotiation request message received from the first device 652. In some examples, the second device 654 may be configured to proceed to block 674 in response to determining not to generate a page monitoring schedule negotiation response message at block 672, and the second device 654 may be configured to proceed to block 676 in response to determining to generate a page monitoring schedule negotiation response at block 672. At block 672, the second device 654 may be configured to analyze the page monitoring schedule negotiation request message received from the first device 652 to determine whether the page monitoring schedule information 658 in the received message includes (1) a request for at least one of the one or more page monitoring parameters 660, (2) a suggestion for at least one of the one or more page monitoring parameters 660, (3) and/or a demand for at least one of the one or more page monitoring parameters 660. If the page monitoring schedule information 658 does not include any demanded values, then the second device 654 may be configured to proceed to block 676.

However, if upon analyzing the received message the second device 654 determines that the page monitoring schedule information 658 includes at least one demanded value, then the second device 654 may be configured to determine whether the second device 654 can establish a page monitoring schedule with the first device 652 using the at least one demanded value. In some examples, if the second device 654 determines that the at least one demanded value cannot be used to establish the page monitoring schedule, the second device 654 may be configured to proceed to block 674, where establishing a page monitoring schedule with the first device 652 is aborted. For example, at block 674, the second device 654 may be configured to not provide a message in response to the first device 652's page monitoring schedule negotiation request message. Instead, the first device 652 may be configured to infer from the absence of a response message that the at least one demanded value included in the page monitoring schedule negotiation request message could not be allocated for use in a page monitoring schedule between the two devices.

In other examples, if the second device 654 determines that the at least one demanded value cannot be used to establish the page monitoring schedule, the second device 654 may be configured to proceed to block 676 to generate a page monitoring schedule negotiation response message, which may include page monitoring schedule information or rejection information. In response to determining that the at least one demanded value in the received message cannot be used to establish the page monitoring schedule, the second device 654 may, at block 676, be configured to generate the page monitoring schedule negotiation response message to include rejection information 682. The rejection information 682 may include information indicative that a page monitoring schedule could not be established with the second device 654 using the at least one demanded value included in the page monitoring schedule negotiation request message transmitted by the first device 652.

At block 676, the second device 654 may be configured to generate a page monitoring schedule negotiation response message to establish a page monitoring schedule with the first device 652. The page monitoring schedule negotiation response message may include page monitoring schedule information 678. The page monitoring schedule information 678 may include information corresponding to one or more page monitoring parameters 680. The one or more page monitoring parameters may correspond to the one or more page monitoring parameters 660 included or requested in the page monitoring schedule negotiation request message received from the first device 652. In the example shown, the one or more page monitoring parameters 680 include: an allocated interval value 680-1, an allocated start TPTT value 680-2, and/or an allocated page monitoring time period value 680-3. At block 684, the second device 654 may be configured to transmit the page monitoring schedule negotiation response message to the first device 652. Block 686 shows the page monitoring schedule negotiation response message being transmitted to the first device 652. At block 688, the first device 652 may be configured to receive the page monitoring schedule negotiation response message.

In some examples, the second device 654 may be configured to generate the page monitoring schedule negotiation response message at block 676 without being triggered based on the reception of a page monitoring schedule negotiation request message. In such examples, the page monitoring schedule negotiation response message may be referred to as a page monitoring schedule command message. For example, the second device 654 may be configured to establish a page monitoring schedule with the first device 652 without receiving any request or any input (e.g., any suggested or demanded values) from the first device 652. In such examples, the second device 654 may be configured to generate the page monitoring schedule command message upon determining the presence of a trigger event. Based on the presence of the trigger event, the second device 654 may be configured generate the page monitoring schedule command message. In some examples, the trigger event includes the determination to establish a page monitoring schedule with the first device 652. The second device 654 may be configured to establish the page monitoring schedule with the first device 652 based on one or more factors, such as being based on the current channel condition over which the second device 654 communicates with the first device 652. For example, the current channel condition may be busy or congested.

By establishing a page monitoring schedule with the first device 652, the second device 654 may reduce network congestion. By controlling the page monitoring schedule for the first device 652 and/or one or more other devices, the second device 654 may be configured to setup a plurality of page monitoring schedules across a plurality of devices in an efficient manner. For example, the second device 654 may be configured to establish a plurality of page monitoring schedules so that at least one common page is monitored by each respective device that the second device 654 has established a page monitoring schedule with. By doing so, network congestion is reduced for any updates that may need to be communicated to all such devices, since the update need only be sent in the at least one common page that each device is configured to monitor for. An update may include new information regarding the second device 654's page transmission times or any other information that may be useful to the devices participating in a page monitoring schedule with the second device 654.

In some examples, the first device 652 may be configured to initiate an association procedure with the second device 654. In such examples, the trigger event may include the initiation of the association procedure with the second device 654. In some examples, the second device 654 may be configured to complete an association procedure with the first device 652. In such examples, the trigger event may include the completion of the association procedure with the first device 652. In some examples, the second device 654 may be configured to receive an association procedure request, such as from the first device 652. In such examples, the trigger event may include the reception of the association procedure request.

Referring to the one or more page monitoring parameters 680 of the page monitoring schedule information 678, the second device 654 may be configured to determine any allocated value to be a demanded value included in the page monitoring negotiation response message. In examples where the one or more parameters 660 included in the page monitoring schedule information 658 in the received message are suggested values, the second device 654 may be configured to select the suggested value as the allocated value or select a value different from the suggested value as the allocated value. In examples where the received message (i.e., the page monitoring schedule negotiation request message) includes a request for page monitoring schedule parameter values, the second device 654 may be configured to select a value to respectively allocate to each parameter for which the first device 652 request a value.

At block 690, the first device 652 may be configured to analyze the page monitoring schedule negotiation response message received from the second device 654 to determine whether the message includes the rejection information 682 or the page monitoring schedule information 678. If the first device 652 determines that the page monitoring schedule negotiation response message includes the rejection information 682, the first device 652 may be configured to not establish a page monitoring schedule with the second device 654, as illustrated at block 692. If the first device 652 determines that the page monitoring schedule negotiation response message includes the page monitoring schedule information 678, the first device 652 may be configured to establish a page monitoring scheduled based on the page monitoring schedule information 678 in the received response message, as illustrated at block 694. For example, the first device 652 may be configured to monitor for one or more pages in accordance with the established page monitoring schedule, as illustrated at block 695.

Following establishment of the page monitoring schedule between the first device 652 and the second device 654, the second device 654 may be configured to transmit one or more pages at one or more page transmission times (e.g., at one or more TPTTs), as illustrated at block 696. In some examples, the one or more pages transmitted by the second device 654 may include information specific to the first device 652 (as illustrated by block 697), and/or information common to the first device 652 and/or one or more other devices (as illustrated by block 698). The first device 652 may be configured to operate in accordance with the techniques described herein upon receiving a page for which the first device 652 is monitoring and/or for which the first device 652 is not monitoring.

In some examples, the first device 652 may be the STA 114 and the second device may be the AP 104 depicted in FIG. 1. In such examples, the page management component 126 may be configured to perform the features described with respect to blocks 656, 690, and 694. The receiver 133 may be configured to perform the features described with respect to block 688. The transmitter 135 may be configured to perform the features described with respect to block 668. The page management component 166 may be configured to perform the features described with respect to 672, 674, and 676. The receiver 127 may be configured to perform the features described with respect to block 670. The transmitter 129 may be configured to perform the features described with respect to blocks 684 and 696.

Figure 7:
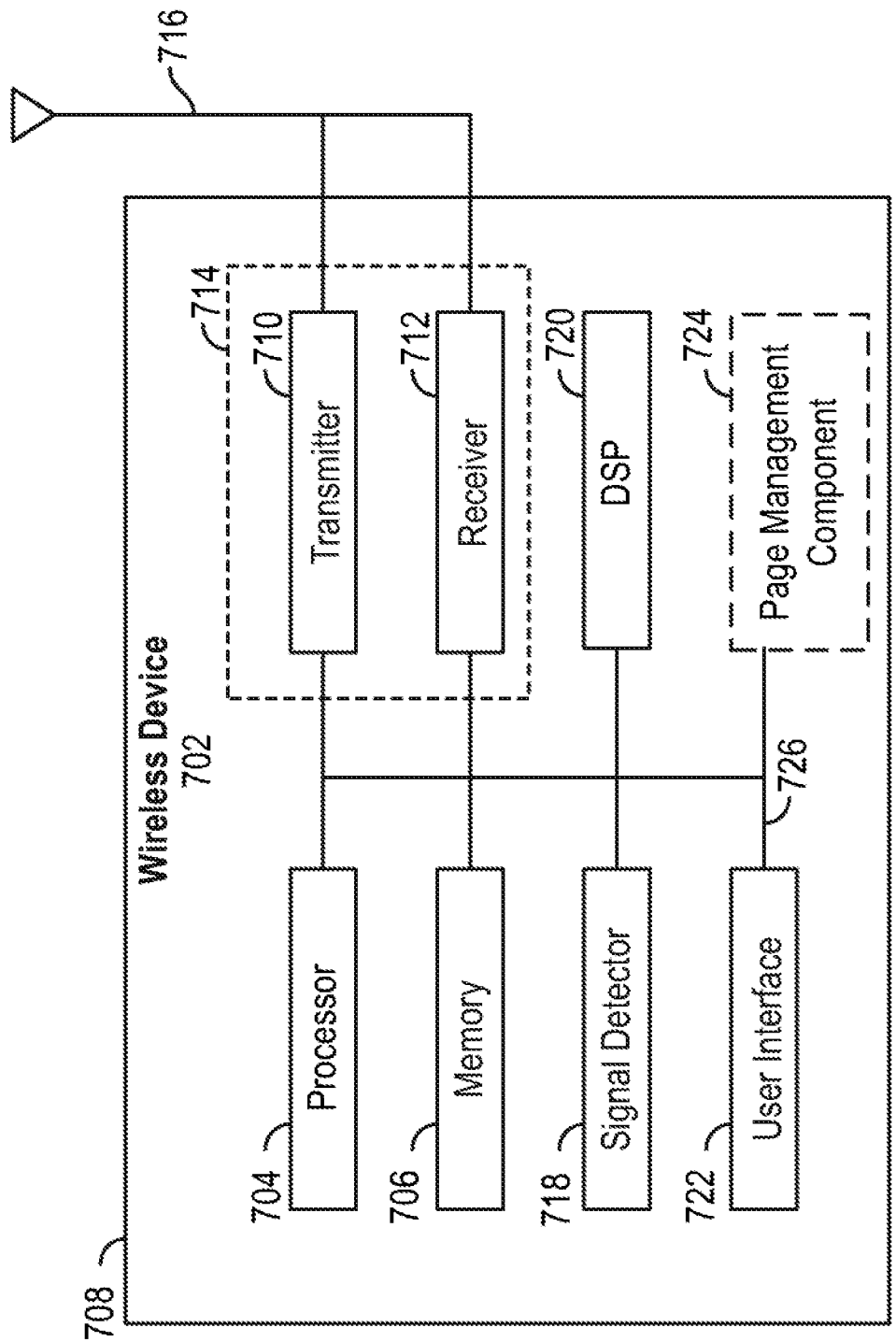
FIG. 7 is an example functional block diagram of a wireless device that may be employed within the wireless communication system of FIG. 1 for wireless communication.

FIG. 7 is a functional block diagram of a wireless device 702 that may be employed within the wireless communication system 100 of FIG. 1. The wireless device 702 is an example of a device that may be configured to implement the various methods described herein. For example, the wireless device 702 may be a STA described herein (e.g., STA 114, STA 604, first device 652 in the example where it is a STA, or any other STA described herein) or an AP described herein (e.g., AP 104, AP 602, second device 654 in the example where it is an AP, or any other AP described herein).

The wireless device 702 may include a processor 704 which controls operation of the wireless device 702. The processor 704 may, in some examples, be referred to as a central processing unit (CPU). Memory 706, which may include both read-only memory (ROM) and random access memory (RAM), may provide instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable (by the processor 704, for example) to implement the methods described herein.

The processor 704 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), application specific integrated circuits (ASICs), controllers, state machines, gated logic, discrete hardware components, dedicated hardware finite state machines, or any other suitable entities that can perform calculations or other manipulations of information. In an aspect, the techniques described herein may be implemented in a modem processor, also referred to as a baseband processor.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 702 may also include a housing 708, and the wireless device 702 may include a transmitter 710 and/or a receiver 712 to allow transmission and reception of data between the wireless device 702 and a remote device. The transmitter 710 and the receiver 712 may be combined into a transceiver 714. An antenna 716 may be attached to the housing 708 and electrically coupled to the transceiver 714. The wireless device 702 may also include multiple transmitters, multiple receivers, multiple transceivers, and/or multiple antennas.

The wireless device 702 may also include a signal detector 718 that may be used to detect and quantify the level of signals received by the transceiver 714 or the receiver 712. The signal detector 718 may detect such signals as total energy, energy per subcarrier per symbol, power spectral density, and other signals. The wireless device 702 may also include a DSP 720 for use in processing signals. The DSP 720 may be configured to generate a packet for transmission. In some aspects, the packet may include a PPDU.

The wireless device 702 may further include a user interface 722 in some aspects. The user interface 722 may include a keypad, a microphone, a speaker, and/or a display. The user interface 722 may include any element or component that conveys information to a user of the wireless device 702 and/or receives input from the user.

The wireless device 702 may include a page management component 724. The page management component 724 may be configured to perform the functions described herein. For example, the page management component 724 may be configured to perform any function described herein with respect to a STA (e.g., the STA 114, the STA 604, or the first device 652). As an example, the page management component 724 may be configured to perform the functions described herein with respect to the figures. As another example, the page management component 724 may be configured to perform the functions described herein with respect to the page management component 126. The transmitter 710 and the receiver 712 may be configured to perform the functions described herein with respect to any transmission or reception function, respectively.

The various components of the wireless device 702 may be coupled together by a bus system 726. The bus system 726 may include a data bus, for example, as well as a power bus, a control signal bus, and a status signal bus in addition to the data bus. Components of the wireless device 702 may be coupled together or accept or provide inputs to each other using some other mechanism.

Although a number of separate components are illustrated in FIG. 7, one or more of the components may be combined or commonly implemented. For example, the processor 704 may be used to implement not only the functionality described above with respect to the processor 704, but also to implement the functionality described above with respect to the signal detector 718, the DSP 720, the user interface 722, and/or the page management component 724. Further, each of the components illustrated in FIG. 7 may be implemented using a plurality of separate elements.

In some examples, the transmitter 710, the receiver 712, the processor 704, the page management component 724, and/or one or more other components illustrated in FIG. 7 may be configured to perform one or more functions discussed herein. In some examples, the transmitter 710 may correspond to the transmitter 135, the receiver 712 may correspond to the receiver 133, the processor 704. The transmitter 1015 may correspond to the transmitter 710. The page management component 1024 may correspond to the page management component 126 and/or the page management component 724. Additionally, the means for performing the various functions described herein may include any structure described herein. For example, with reference to FIG. 7, the means for performing the various functions described herein may include one or more components of the wireless device 702. As an example, the means for performing the various functions described herein may include the receiver 712, the transmitter 710, the processor 704, and/or the page management component 724.

Figure 8:
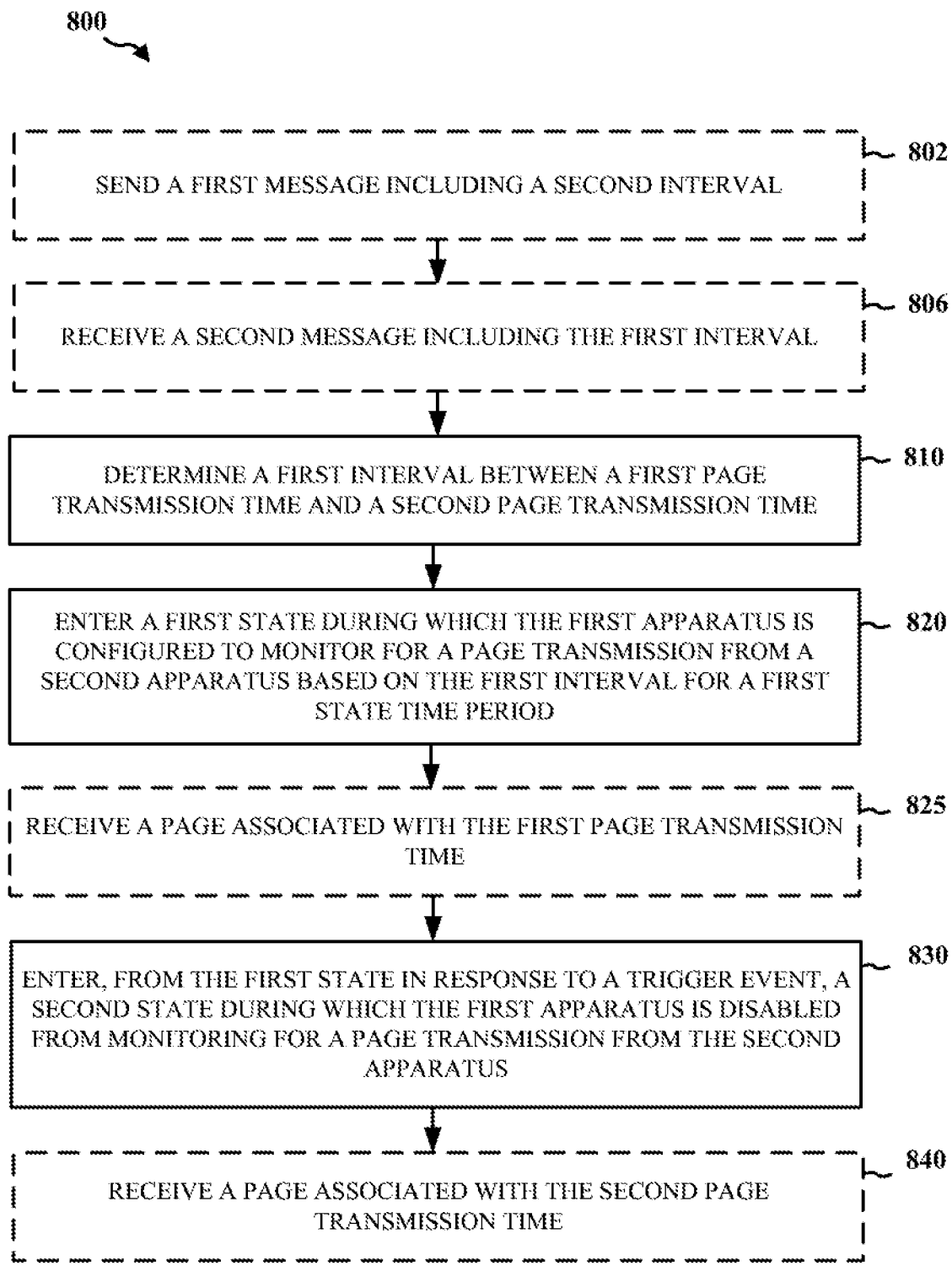
FIG. 8 is a flowchart of an example method of for wireless communication in accordance with the techniques described herein.

FIG. 8 is a flowchart of an example method of wireless communication in accordance with the techniques described herein. The method 800 may be performed using a first apparatus (e.g., any STA, AP, or device described herein).

At block 810, the first apparatus may be configured to determine a first interval between a first page transmission time and a second page transmission time. In some examples, at least one page transmission time may exist between the first page transmission time and the second page transmission time. For example, a third page transmission time may exist between the first page transmission time and the second page transmission time. In other examples, at least N page transmission times may exist between the first page transmission time and the second page transmission time, where N is any integer value. At block 820, the first apparatus may be configured to enter a first state during which the first apparatus is configured to monitor for a page transmission from a second apparatus (e.g., any AP described herein or any device configured to transmit pages as described herein) based on the first interval for a first state time period.

In some examples, the first interval may be one interval of an interval cycle. For example, the first interval may be cyclical or otherwise repeat. In such an example, a subsequent first interval (i.e., a subsequent interval having the same length as the first interval) to the first interval between the first and second page transmission times may be between the second page transmission time and a fourth page transmission time. In some examples, at least one page transmission time may exist between the second page transmission time and the fourth page transmission time. For example, a fifth page transmission time may exist between the second page transmission time and the fourth page transmission time. In some examples, the first interval may have a start time and an end time.

Regarding the first interval between the first and second page transmission times, the start time of the first interval may be relative to the first page transmission time and the end time of the first interval may be relative to the second page transmission time. The end time of the first interval may be relative to the start time of the of the first state time period. The start time of the first state time period may be before the end time of the first interval.

Regarding the example subsequent first interval (i.e., a subsequent interval having the same length as the first interval) between the second and fourth page transmission times, the start time of the subsequent first interval may be relative to the second page transmission time and the end time of the subsequent first interval may be relative to the fourth page transmission time. The end time of the subsequent first interval may be relative to the start time of the of the first state time period. The start time of the first state time period may be before the end time of the subsequent first interval.

At block 830, the first apparatus may be configured to enter, from the first state in response to a trigger event, a second state during which the first apparatus is disabled from monitoring for a page transmission from the second apparatus. In some examples, the trigger event may include reception of a page associated with the second page transmission time before expiration of the first state time period and/or expiration of the first state time period. In some examples, the first apparatus may enter the second state for the duration of the first interval. In other examples, the first apparatus may be configured to enter the second state for the duration of the first interval minus (1) an elapsed period of time from the start time of the first interval to the time at which the first apparatus enters the second state corresponding to the first state time period and (2) the amount of time the first apparatus is configured to initiate the first time period before the start time of the subsequent interval. For example, if the second page transmission time is at 100 time units, the start time of the first state time period may be at 98 time units (2 time units before the second page transmission time). The first state time period may be 10 time units in length, meaning that the first state time period expires at 108 time units. The first apparatus may receive the page corresponding to the second page transmission at 101 time units. The first interval may have a length of 100 time units, meaning that the subsequent first interval between the second and fourth page transmission times may also have a length of 100 time units. The start time of the first state time period for the subsequent first interval may be 198. In this example, the first apparatus may be configured to enter the second state for 90 time units, which is derived as follows in this example: 100−((108−100)+2).

In some examples, the first apparatus may be configured to receive a page in both the first state and the second state. However, when the first apparatus is configured to operate in the first state, the first apparatus may be configured to monitor information received from the second apparatus; and, if an expected page is received, the first apparatus may be configured to perform processing on the received page and/or perform one or more other processes based on reception of the page. In some examples, the first apparatus may be configured to extract information from a received page. When the first apparatus is configured to operate in the second state, the first apparatus may be configured to not monitor information received from the second apparatus, which may also mean that the first apparatus configured to not extract information a received page when operating in the second state.

In some examples, the first apparatus may be configured to transmit, to the second apparatus, a first message including a second interval, as illustrated at block 802. In response, the first apparatus may be configured to receive, from the second apparatus, a second message including the first interval, as illustrated at block 806. In such examples, to determine the first interval, the first apparatus may be configured to determine the first interval from the received message. In some examples, the second interval may be equal to the first interval. In other examples, the second interval may be different from the first interval.

In some examples, the first apparatus may be configured to receive a page associated with the first page transmission time, as illustrated at block 825. The first apparatus may be configured to enter the second state for the duration of the interval in response to the reception of the page associated with the first page transmission time. In some examples, entering the first state may occur after entering the second state for the duration of the interval in response to the reception of the page associated with the first page transmission time.

In some examples, the first apparatus may be configured to a receive a page associated with the second page transmission time, as illustrated at block 840. The page associated with the second page transmission time may include information indicative of a schedule for communication with the second apparatus. Otherwise described, the page associated with the second page transmission time may update or modify the page monitoring schedule associated with the first interval. The page associated with the second page transmission time may include information indicative of a change to the first interval. For example, the information indicative of a change to the first interval may include a new duration for the first interval. As another example, the information indicative of a change to the first interval may include the difference between the duration of the first interval and a new duration for the first interval. For example, if the first interval is being updated from 100 time units to 200 time units, the information indicative of the change to the first interval may include the new duration of 200 time units or the difference value of 100 time units (i.e., the difference between 200 time units and 100 time units).

Figure 9:
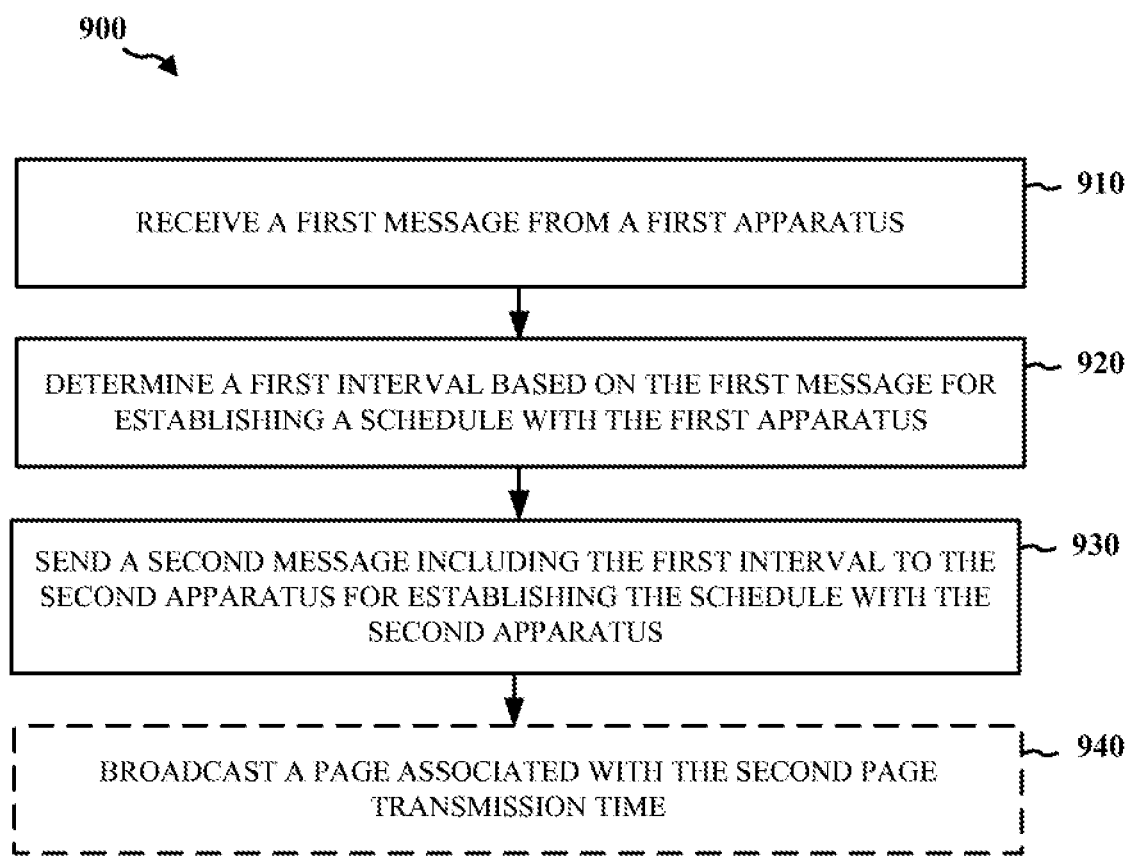
FIG. 9 is a flowchart of an example method of for wireless communication in accordance with the techniques described herein.

FIG. 9 is a flowchart of an example method of wireless communication in accordance with the techniques described herein. The method 900 may be performed using a first apparatus (e.g., any STA, AP, or device described herein).

At block 910, the first apparatus may be configured to receive, from a first apparatus (e.g., STA 114), a first message. At block 920, the first apparatus may be configured to determine a first interval based on the first message for establishing a schedule with the first apparatus. The schedule may include the first interval between a first page transmission time and a second page transmission time. In some examples, at least one page transmission time may exist between the first page transmission time and the second page transmission time. For example, a third page transmission time may exist between the first page transmission time and the second page transmission time. In other examples, at least N page transmission times may exist between the first page transmission time and the second page transmission time, where N is any integer value.

At block 930, the first apparatus may be configured to transmit a second message including the first interval to the second apparatus for establishing the schedule with the second apparatus. In some examples, the first message may include a second interval. In some examples, the first interval may be equal to the second interval. In other examples, the first interval may be different from the second interval. In some examples, the first interval may have a start time and an end time. The start time of the first interval may be relative to the first page transmission time and the end time of the first interval may be relative to the second page transmission time.

In some examples, the first apparatus may be configured to broadcast a page associated with the second page transmission time, as illustrated at block 940. The page associated with the second page transmission time may include information indicative of a schedule for communication with the first apparatus. The page associated with the second page transmission time may include information indicative of a change to the first interval. Otherwise described, the page associated with the second page transmission time may update or modify the schedule associated with the first interval. For example, the information indicative of a change to the first interval may include a new duration for the first interval. As another example, the information indicative of a change to the first interval may include the difference between the duration of the first interval and a new duration for the first interval. For example, if the first interval is being updated from 100 time units to 200 time units, the information indicative of the change to the first interval may include the new duration of 200 time units or the difference value of 100 time units (i.e., the difference between 200 time units and 100 time units).

Various examples in accordance with the techniques of this disclosure are described herein. Such examples include the examples include the examples described above as well as the examples described below.

Example 1

A method of wireless communication by a wireless device, comprising: determining a wakeup cycle to receive a page and an awake time period, wherein the awake time period is a maximum time period during which the wireless device stays awake to receive the page; activating communication capability with an access point at a start time of a current cycle of the wakeup cycle; and maintaining the communication capability with the access point to receive a page from the access point at least until the awake time period expires after the start time of the current wakeup cycle.

Example 2

The method of example 1, further comprising: deactivating the communication capability with the access point upon expiration of the awake time period.

Example 3

The method of example 2, wherein the deactivating the communication capability comprises at least one of: entering a power save mode, or participating in communication with another access point or another network unrelated to the access point.

Example 4

The method of example 2, further comprising: activating the communication capability at a subsequent page transmission time to receive a page after deactivating the communication capability with the access point if no page is received during the awake time period after the start time of the current wakeup cycle.

Example 5

The method of example 2, further comprising: activating the communication capability at a start time of a next cycle of the wakeup cycle to receive a page after deactivating the communication capability with the access point if no page is received during the awake time period after the start time of the current wakeup cycle.

Example 6

The method of example 1, wherein at least one of the wakeup cycle or the awake time period is determined during a negotiation between the wireless device and the access point.

Example 7

The method of example 6, wherein the wakeup cycle and the awake time period are reported to the access point during the negotiation.

Example 8

The method of example 6, wherein the negotiation is based on a target wake time (TWT) negotiation mechanism.

Example 9

The method of example 1, wherein the wakeup cycle is determined based on at least one of an implementation, a power state of the wireless device, or a current channel condition.

Example 10

The method of example 1, wherein the awake time period is determined based on at least one of an implementation, a power state of the wireless device or a current channel condition.

Example 11

The method of example 1, wherein the wakeup cycle is based on target beacon transmission time (TBTT).

Example 12

The method of example 1, wherein the page includes at least one of a beacon, fast initial link setup (FILS) discovery frame, or a traffic indication map (TIM) frame.

Example 13

A method of wireless communication by an access point, comprising: negotiating with a wireless device for a wakeup cycle and an awake time period; and receiving the wakeup cycle and the awake time period from the wireless device, wherein a start time of each cycle of the wakeup cycle is a time at which the wireless device activates communication capability with the access point to receive a page from the access point and the awake time period is a maximum time period during which the wireless device maintains the communication capability to receive the page from the access point.

Example 14

The method of example 13, further comprising: determining whether to transmit information specific to the wireless device in the page based on the wakeup cycle and the awake time period.

Example 15

The method of example 13, wherein the determining whether to transmit information specific to the wireless device in the page comprises: determining whether the access point is able to transmit the page before the awake time period expires at a current cycle of the wakeup cycle; and transmitting the information specific to the wireless device in a page at a subsequent page transmission time if the access point is not able to transmit the page before the awake time expires at the current cycle.

Example 16

The method of example 15, wherein the determining whether to transmit information specific to the wireless device in the page further comprises: transmitting the information specific to the wireless device in a page at a start time of a next cycle of the wakeup cycle if the access point is able to transmit the page before the awake time expires at the current cycle.

Example 17

The method of example 13, wherein the wakeup cycle is based on at least one of an implementation, a power state of the wireless device, or a current channel condition.

Example 18

The method of example 13, wherein the awake time period is based on at least one of an implementation, a power state of the wireless device, or a current channel condition.

Example 19

The method of example 13, wherein the wakeup cycle is based on at least one of target beacon transmission time (TBTT).

Example 20

The method of example 13, wherein the negotiation is based on a target wake time (TWT) negotiation mechanism.

Example 21

The method of example 13, wherein the page includes at least one of a beacon, fast initial link setup (FILS) discovery frame, or a traffic indication map (TIM) frame.

Example 22

A wireless device for wireless communication, comprising: means for determining a wakeup cycle to receive a page and an awake time period, wherein the awake time period is a maximum time period during which the wireless device stays awake to receive the page; means for activating communication capability with an access point at a start time of a current cycle of the wakeup cycle; and means for maintaining the communication capability with the access point to receive a page from the access point at least until the awake time period expires after the start time of the current wakeup cycle.

Example 23

The wireless device of example 22, further comprising: means for deactivating the communication capability with the access point upon expiration of the awake time period.

Example 24

The wireless device of example 23, wherein the means for deactivating the communication capability is configured to perform at least one of: entering a power save mode, or participating in communication with another access point or another network unrelated to the access point.

Example 25

The wireless device of example 23, further comprising: means for activating the communication capability at a subsequent page transmission time to receive a page after deactivating the communication capability with the access point if no page is received during the awake time period after the start time of the current wakeup cycle.

Example 26

The wireless device of example 23, further comprising: means for activating the communication capability at a start time of a next cycle of the wakeup cycle to receive a page after deactivating the communication capability with the access point if no page is received during the awake time period after the start time of the current wakeup cycle.

Example 27

The wireless device of example 22, wherein at least one of the wakeup cycle or the awake time period is determined during a negotiation between the wireless device and the access point.

Example 28

The wireless device of example 27, wherein the wakeup cycle and the awake time period are reported to the access point during the negotiation.

Example 29

The wireless device of example 27, wherein the negotiation is based on a target wake time (TWT) negotiation mechanism.

Example 30

The wireless device of example 22, wherein the wakeup cycle is determined based on at least one of an implementation, a power state of the wireless device, or a current channel condition.

Example 31

The wireless device of example 22, wherein the awake time period is determined based on at least one of an implementation, a power state of the wireless device or a current channel condition.

Example 32

The wireless device of example 22, wherein the wakeup cycle is based on target beacon transmission time (TBTT).

Example 33

The wireless device of example 22, wherein the page includes at least one of a beacon, fast initial link setup (FILS) discovery frame, or a traffic indication map (TIM) frame.

Example 34

An access point for wireless communication, comprising: means for negotiating with a wireless device for a wakeup cycle and an awake time period; and means for receiving the wakeup cycle and the awake time period from the wireless device, wherein a start time of each cycle of the wakeup cycle is a time at which the wireless device activates communication capability with the access point to receive a page from the access point and the awake time period is a maximum time period during which the wireless device maintains the communication capability to receive the page from the access point.

Example 35

The access point of example 34, further comprising: means for determining whether to transmit information specific to the wireless device in the page based on the wakeup cycle and the awake time period.

Example 36

The access point of example 34, wherein the means for determining whether to transmit information specific to the wireless device in the page is configured to: determine whether the access point is able to transmit the page before the awake time period expires at a current cycle of the wakeup cycle; and transmit the information specific to the wireless device in a page at a subsequent page transmission time if the access point is not able to transmit the page before the awake time expires at the current cycle.

Example 37

The access point of example 36, wherein the means for determining whether to transmit information specific to the wireless device in the page is further configured to: transmit the information specific to the wireless device in a page at a start time of a next cycle of the wakeup cycle if the access point is able to transmit the page before the awake time expires at the current cycle.

Example 38

The access point of example 34, wherein the wakeup cycle is based on at least one of an implementation, a power state of the wireless device, or a current channel condition.

Example 39

The access point of example 34, wherein the awake time period is based on at least one of an implementation, a power state of the wireless device, or a current channel condition.

Example 40

The access point of example 34, wherein the wakeup cycle is based on at least one of target beacon transmission time (TBTT).

Example 41

The access point of example 34, wherein the negotiation is based on a target wake time (TWT) negotiation mechanism.

Example 42

The access point of example 34, wherein the page includes at least one of a beacon, fast initial link setup (FILS) discovery frame, or a traffic indication map (TIM) frame.

Example 43

A wireless device for wireless communication, comprising: a memory; and at least one processor coupled to the memory and configured to: determine a wakeup cycle to receive a page and an awake time period, wherein the awake time period is a maximum time period during which the wireless device stays awake to receive the page; activate communication capability with an access point at a start time of a current cycle of the wakeup cycle; and maintain the communication capability with the access point to receive a page from the access point at least until the awake time period expires after the start time of the current wakeup cycle.

Example 44

The wireless device of example 43, wherein the at least one processor is configured to: deactivating the communication capability with the access point upon expiration of the awake time period.

Example 45

The wireless device of example 44, wherein the at least one processor configured to deactivate the communication capability is configured to perform at least one of: entering a power save mode, or participating in communication with another access point or another network unrelated to the access point.

Example 46

The wireless device of example 44, wherein the at least one processor is configured to: activate the communication capability at a subsequent page transmission time to receive a page after deactivating the communication capability with the access point if no page is received during the awake time period after the start time of the current wakeup cycle.

Example 47

The wireless device of example 44, wherein the at least one processor is configured to: activate the communication capability at a start time of a next cycle of the wakeup cycle to receive a page after deactivating the communication capability with the access point if no page is received during the awake time period after the start time of the current wakeup cycle.

Example 48

The wireless device of example 43, wherein at least one of the wakeup cycle or the awake time period is determined during a negotiation between the wireless device and the access point.

Example 49

The wireless device of example 48, wherein the wakeup cycle and the awake time period are reported to the access point during the negotiation.

Example 50

The wireless device of example 48, wherein the negotiation is based on a target wake time (TWT) negotiation mechanism.

Example 51

The wireless device of example 43, wherein the wakeup cycle is determined based on at least one of an implementation, a power state of the wireless device, or a current channel condition.

Example 52

The wireless device of example 43, wherein the awake time period is determined based on at least one of an implementation, a power state of the wireless device or a current channel condition.

Example 53

The wireless device of example 43, wherein the wakeup cycle is based on target beacon transmission time (TBTT).

Example 54

The wireless device of example 43, wherein the page includes at least one of a beacon, fast initial link setup (FILS) discovery frame, or a traffic indication map (TIM) frame.

Example 55

An access point for wireless communication, comprising: a memory; and at least one processor coupled to the memory and configured to: negotiate with a wireless device for a wakeup cycle and an awake time period; and receive the wakeup cycle and the awake time period from the wireless device, wherein a start time of each cycle of the wakeup cycle is a time at which the wireless device activates communication capability with the access point to receive a page from the access point and the awake time period is a maximum time period during which the wireless device maintains the communication capability to receive the page from the access point.

Example 56

The access point of example 55, wherein the at least one processor is configured to: determine whether to transmit information specific to the wireless device in the page based on the wakeup cycle and the awake time period.

Example 57

The access point of example 55, wherein the at least one processor configured to determine whether to transmit information specific to the wireless device in the page is configured to: determine whether the access point is able to transmit the page before the awake time period expires at a current cycle of the wakeup cycle; and transmit the information specific to the wireless device in a page at a subsequent page transmission time if the access point is not able to transmit the page before the awake time expires at the current cycle.

Example 58

The access point of example 57, wherein the at least one processor configured to determine whether to transmit information specific to the wireless device in the page is further configured to: transmit the information specific to the wireless device in a page at a start time of a next cycle of the wakeup cycle if the access point is able to transmit the page before the awake time expires at the current cycle.

Example 59

The access point of example 55, wherein the wakeup cycle is based on at least one of an implementation, a power state of the wireless device, or a current channel condition.

Example 60

The access point of example 55, wherein the awake time period is based on at least one of an implementation, a power state of the wireless device, or a current channel condition.

Example 61

The access point of example 55, wherein the wakeup cycle is based on at least one of target beacon transmission time (TBTT).

Example 62

The access point of example 55, wherein the negotiation is based on a target wake time (TWT) negotiation mechanism.

Example 63

The access point of example 55, wherein the page includes at least one of a beacon, fast initial link setup (FILS) discovery frame, or a traffic indication map (TIM) frame.

Example 64

A computer-readable medium storing computer executable code for a wireless device, comprising code to: determine a wakeup cycle to receive a page and an awake time period, wherein the awake time period is a maximum time period during which the wireless device stays awake to receive the page; activate communication capability with an access point at a start time of a current cycle of the wakeup cycle; and maintain the communication capability with the access point to receive a page from the access point at least until the awake time period expires after the start time of the current wakeup cycle.

Example 65

A computer-readable medium storing computer executable code for an access point, comprising code to: negotiate with a wireless device for a wakeup cycle and an awake time period; and receive the wakeup cycle and the awake time period from the wireless device, wherein a start time of each cycle of the wakeup cycle is a time at which the wireless device activates communication capability with the access point to receive a page from the access point and the awake time period is a maximum time period during which the wireless device maintains the communication capability to receive the page from the access point.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an ASIC, an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium includes a non-transitory computer readable medium (e.g., tangible media).

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may include a computer program product for performing the operations presented herein. For example, such a computer program product may include a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of this disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by a first device, comprising:
   determining an interval between a first page transmission time and a second page transmission time of a sequence of page transmission times, wherein the first page transmission time and the second page transmission time are non-consecutive page transmission times of the sequence of page transmission times;
   entering, based on the interval, an awake state during which the first device is monitoring for a page transmission associated with the sequence of page transmission times from the second device, wherein the entering of the awake state is from a sleep state and for an awake state time period;
   entering, from the awake state and in response to a trigger event, the sleep state during which the first device is disabled from monitoring for a page transmission from the second device, wherein the trigger event includes reception of a page associated with the second page transmission time before expiration of the awake state time period; and
   modifying a page monitoring schedule associated with the interval based on the page associated with the second page transmission time.

2. The method of claim 1, wherein entering the sleep state comprises:
   entering the sleep state for a duration of the interval; or
   entering the sleep state for the duration of the interval minus an elapsed period of time corresponding to the awake state time period.

3. The method of claim 1, wherein the interval has a start time and an end time, the start time of the interval being relative to the first page transmission time and the end time of the interval being relative to the second page transmission time.

4. The method of claim 3, wherein the end time of the interval is relative to a start time of the awake state time period.

5. The method of claim 4, wherein the start time of the awake state time period is before the end time of the interval.

6. The method of claim 1, further comprising:
   receiving, from the second device, a message including the interval, wherein determining the interval includes determining the interval from the received message.

7. The method of claim 1, wherein the interval is a first interval, and the method further comprises:
   sending, to the second device, a first message including a second interval; and
   receiving, from the second device, a second message including the first interval, wherein determining the first interval includes determining the first interval from the received message.

8. The method of claim 7, wherein the second interval is equal to the first interval.

9. The method of claim 7, wherein the second interval is different from the first interval.

10. The method of claim 1, further comprising:
    receiving a page associated with the first page transmission time; and
    entering the sleep state for a duration of the interval in response to receiving the page associated with the first page transmission time, wherein entering the awake state occurs after entering the sleep state for the duration of the interval in response to receiving the page associated with the first page transmission time.

11. The method of claim 1, further comprising:
    receiving the page associated with the second page transmission time, wherein the page includes information for processing by the first device.

12. The method of claim 11, wherein the information for processing by the first device indicates a schedule for communication with the second device.

13. The method of claim 11, wherein the information for processing by the first device indicates a change to the interval.

14. The method of claim 1, wherein the first page transmission time and the second page transmission time are each a respective time at which the second device is scheduled to broadcast a respective page.

15. The method of claim 1, wherein a plurality of page transmission times exist between the first page transmission time and the second page transmission time, wherein the plurality of page transmission times are consecutive page transmission times in the sequence of page transmission times, and wherein page transmission are transmitted at each of the page transmission times of the sequence of page transmission times.

16. The method of claim 1, wherein the interval is based on at least one of a power state of the first device or a channel condition for communication with a second device.

17. A first device, comprising:
  a memory; and
  at least one processor communicatively coupled to the memory, wherein the at least one processor is configured to:
    determine an interval between a first page transmission time and a second page transmission time of a sequence of page transmission times, wherein the first page transmission time and the second page transmission time are non-consecutive page transmission times of the sequence of page transmission times;
    cause the first device to enter, based on the interval, an awake state during which the first device is configured to monitor for a page transmission associated with the sequence of page transmission times from the second device, wherein the entering of the awake state is from a sleep state and for an awake state time period;
    cause the first device to enter, from the awake state and in response to a trigger event, the sleep state during which the first device is disabled from monitoring for a page transmission from the second device, wherein the trigger event includes reception of a page associated with the second page transmission time before expiration of the awake state time period and
    modify a page monitoring schedule associated with the interval based on the page associated with the second page transmission time.

18. The first device of claim 17, wherein to enter the sleep state, the at least one processor is configured to:
  cause the first device to enter the sleep state for a duration of the interval; or
  cause the first device to enter the sleep state for the duration of the interval minus an elapsed period of time corresponding to the awake state time period.

19. The first device of claim 17, wherein the interval has a start time and an end time, the start time of the interval being relative to the first page transmission time and the end time of the interval being relative to the second page transmission time.

20. The first device of claim 19, wherein the end time of the interval is relative to a start time of the awake state time period.

21. The first device of claim 20, wherein the start time of the awake state time period is before the end time of the interval.

22. The first device of claim 17, wherein the at least one processor is configured to:
  receive, from the second device, a message including the interval, wherein to determine the interval, the at least one processor is configured to determine the interval from the received message.

23. The first device of claim 17, wherein the interval is a first interval, and wherein the at least one processor is configured to:
  cause a first message including a second interval to be transmitted to the second device; and
  receive, from the second device, a second message including the first interval, wherein to determine the first interval, the at least one processor is configured to determine the first interval from the received second message.

24. The first device of claim 23, wherein the second interval is equal to the first interval.

25. The first device of claim 23, wherein the second interval is different from the first interval.

26. The first device of claim 17, wherein the at least one processor is configured to:
  receive a page associated with the first page transmission time; and
  cause the first device to enter the sleep state for a duration of the interval in response to reception of the page associated with the first page transmission time, wherein the at least one processor is configured to enter the awake state after entering the sleep state for the duration of the interval in response to reception of the page associated with the first page transmission time.

27. The first device of claim 17, wherein the at least one processor is configured to:
  receive the page associated with the second page transmission time, wherein the page includes information for processing by the first device.

28. The first device of claim 27, wherein the information for processing by the first device indicates a schedule for communication with the second device.

29. The first device of claim 27, wherein the information for processing by the first device indicates a change to the interval.

30. The first device of claim 17, wherein the first page transmission time and the second page transmission time are each a respective time at which the second device is scheduled to broadcast a respective page.

31. The first device of claim 17, wherein a plurality of page transmission times exist between the first page transmission time and the second page transmission time, wherein the plurality of page transmission times are consecutive page transmission times in the sequence of page transmission times, and wherein page transmission are transmitted at each of the page transmission times of the sequence of page transmission times.

32. The first device of claim 17, wherein the interval is based on at least one of a power state of the first device or a channel condition for communication with a second device.

33. A method of wireless communication by a first device, comprising:
  receiving, from a second device, a first message;
  determining a first interval based on the first message for establishing a schedule with the second device, the schedule including the first interval between a first page transmission time and a second page transmission time of a sequence of page transmission times, wherein the first page transmission time and the second page transmission time are non-consecutive page transmission times of the sequence of page transmission times;
  sending a second message including the first interval to the second device for establishing the schedule with the second device; and
  sending a page transmission associated with the sequence of page transmission times to the second device at a page transmission time based on the schedule, the page transmission including information indicative of a change to the first interval, wherein the second device is to enter, from a sleep state and based on the first interval, an awake state during which the second device is to monitor for the page transmission from the first device, and wherein the second device is to enter, from the awake state and in response to a trigger event, the sleep state during which the second device is to be disabled from monitoring for a page transmission from the first device, and wherein the trigger event includes reception of a page associated with the second page transmission time by the second device before expiration of an awake state time period.

34. The method of claim 33, wherein the first message includes a second interval.

35. The method of claim 34, wherein the first interval is equal to the second interval.

36. The method of claim 34, wherein the first interval is different from the second interval.

37. The method of claim 33, wherein the first interval has a start time and an end time, the start time of the first interval being relative to the first page transmission time and the end time of the first interval being relative to the second page transmission time.

38. The method of claim 33, further comprising:
broadcasting the page associated with the second page transmission time, wherein the page includes information for processing by the second device.

39. The method of claim 38, wherein the information for processing by the second device indicates a schedule for communication with the first device.

40. The method of claim 33, wherein a plurality of page transmission times exist between the first page transmission time and the second page transmission time, wherein the plurality of page transmission times are consecutive page transmission times in the sequence of page transmission times, and wherein page transmission are transmitted at each of the page transmission times of the sequence of page transmission times.

41. A first device, comprising:
a memory; and
at least one processor communicatively coupled to the memory, wherein the at least one processor is configured to:
receive, from a second device, a first message;
cause the first device to determine a first interval based on the first message for establishing a schedule with the second device, the schedule including the first interval between a first page transmission time and a second page transmission time of a sequence of page transmission times, wherein the first page transmission time and the second page transmission time are non-consecutive page transmission times of the sequence of page transmission times;
cause the first device to send a second message including the first interval to the second device for establishing the schedule with the second device; and
cause the first device to send a page transmission associated with the sequence of page transmission times to the second device at a page transmission time based on the schedule, the page transmission including information indicative of a change to the first interval, wherein the second device is to enter, from a sleep state and based on the first interval, an awake state during which the second device is to monitor for the page transmission from the first device, and wherein the second device is to enter, from the awake state and in response to a trigger event, the sleep state during which the second device is to be disabled from monitoring for a page transmission from the first device, and wherein the trigger event includes reception of a page associated with the second page transmission time by the second device before expiration of an awake state time period.

42. The first device of claim 41, wherein the first message includes a second interval.

43. The first device of claim 42, wherein the first interval is equal to the second interval.

44. The first device of claim 42, wherein the first interval is different from the second interval.

45. The first device of claim 41, wherein the first interval has a start time and an end time, the start time of the first interval being relative to the first page transmission time and the end time of the first interval being relative to the second page transmission time.

46. The first device of claim 41, wherein the at least one processor is configured to:
cause the first device to broadcast the page associated with the second page transmission time, wherein the page includes information for processing by the second device.

47. The first device of claim 46, wherein the information for processing by the second device indicates a schedule for communication with the first device.

48. The first device of claim 41, wherein the at least one processor is configured to:
cause the first device to broadcast the page associated with the second page transmission time, wherein the page includes information indicative of a change to the first interval.

49. The first device of claim 41, wherein a plurality of page transmission times exist between the first page transmission time and the second page transmission time, wherein the plurality of page transmission times are consecutive page transmission times in a sequence of page transmission times, and wherein page transmission are transmitted at each of the page transmission times of the sequence of page transmission times.

\* \* \* \* \*